United States Patent
Kim et al.

(10) Patent No.: US 10,614,279 B2
(45) Date of Patent: Apr. 7, 2020

(54) APPARATUS AND METHOD FOR DRIVING FINGERPRINT SENSING ARRAY PROVIDED IN TOUCHSCREEN, AND DRIVER INTEGRATED CIRCUIT FOR DRIVING THE TOUCHSCREEN INCLUDING THE FINGERPRINT SENSING ARRAY

(71) Applicant: SAMSUNG ELECTRONICS CO., LTD., Suwon-si (KR)

(72) Inventors: Sun-kwon Kim, Yongin-si (KR);
Min-gyu Kim, Seongnam-si (KR);
Yoon-Kyung Choi, Seoul (KR);
Seong-il Park, Hwaseong-si (KR);
Se-woong Ahn, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 32 days.

(21) Appl. No.: 15/995,953

(22) Filed: Jun. 1, 2018

(65) Prior Publication Data
US 2018/0349667 A1 Dec. 6, 2018

(30) Foreign Application Priority Data

Jun. 2, 2017 (KR) .................. 10-2017-0069277
Dec. 11, 2017 (KR) .................. 10-2017-0169529

(51) Int. Cl.
*G06K 9/00* (2006.01)
*G06F 3/044* (2006.01)
*G06F 3/041* (2006.01)

(52) U.S. Cl.
CPC ........... *G06K 9/0002* (2013.01); *G06F 3/044* (2013.01); *G06F 3/0416* (2013.01); *G06F 2203/0338* (2013.01)

(58) Field of Classification Search
CPC ........ G06F 21/32; G06F 3/0416; G06F 3/044; G06F 2203/0338; G06F 21/00; G06F 21/30; G06K 9/00006; G06K 9/001; G06K 9/00; G06K 9/0008; G06Q 20/40145; G06Q 20/40; G06Q 20/4014; H04L 63/0861; H04L 9/3231; H04W 12/06; H04W 12/08
See application file for complete search history.

(56) References Cited

U.S. PATENT DOCUMENTS 8,564,314 B2  10/2013  Shaikh et al.
8,743,082 B2   6/2014  Ganapathi et al.
9,310,940 B2   4/2016  Brosnan
(Continued)

FOREIGN PATENT DOCUMENTS

KR   10-2015-0134664 A    12/2015
KR      1020160172933    * 12/2016

*Primary Examiner* — Michael J Eurice
(74) *Attorney, Agent, or Firm* — Sughrue Mion, PLLC

(57) ABSTRACT

Provided are a fingerprint controller for driving a fingerprint sensing array in a touchscreen divided by at least a touch sensing region and a fingerprint sensing region, a method of operating the fingerprint controller, and a driver integrated circuit for driving the touchscreen including the fingerprint sensing array. The method includes: receiving a reference timing signal from an external module; generating a fingerprint sensing timing signal for driving the fingerprint sensing array in synchronization with the reference timing signal; and driving the fingerprint sensing array based on the fingerprint sensing timing signal.

19 Claims, 27 Drawing Sheets

(56) References Cited

U.S. PATENT DOCUMENTS

| | | | |
|---|---|---|---|
| 2015/0135108 A1* | 5/2015 | Pope | G06K 9/00006 |
| | | | 715/767 |
| 2015/0161836 A1* | 6/2015 | Park | G07C 9/00134 |
| | | | 340/5.51 |
| 2015/0261378 A1 | 9/2015 | Lee et al. | |
| 2016/0063230 A1* | 3/2016 | Alten | G06F 21/32 |
| 2016/0098140 A1 | 4/2016 | Lee et al. | |
| 2016/0179263 A1 | 6/2016 | Erhart et al. | |
| 2016/0246396 A1* | 8/2016 | Dickinson | G06F 3/03545 |
| 2016/0370866 A1* | 12/2016 | Hwang | G06F 3/017 |
| 2016/0379039 A1 | 12/2016 | Dagan et al. | |
| 2017/0004484 A1* | 1/2017 | Seol | G06F 3/0482 |
| 2017/0046008 A1 | 2/2017 | Chen et al. | |
| 2017/0046556 A1* | 2/2017 | Kim | G06F 3/04883 |
| 2017/0285904 A1* | 10/2017 | Khalafallah | G06F 3/0488 |
| 2017/0336909 A1* | 11/2017 | Song | G06F 3/0416 |
| 2018/0144111 A1* | 5/2018 | Katingari | G06F 3/0416 |
| 2018/0173923 A1* | 6/2018 | Lee | G06K 9/0004 |
| 2018/0218195 A1* | 8/2018 | Sheik-Nainar | G06K 9/00013 |
| 2019/0217818 A1* | 7/2019 | Ye | B60R 25/252 |

\* cited by examiner

US 10,614,279 B2

APPARATUS AND METHOD FOR DRIVING FINGERPRINT SENSING ARRAY PROVIDED IN TOUCHSCREEN, AND DRIVER INTEGRATED CIRCUIT FOR DRIVING THE TOUCHSCREEN INCLUDING THE FINGERPRINT SENSING ARRAY

CROSS-REFERENCE TO THE RELATED APPLICATION

This application claims priority from Korean Patent Application No. 10-2017-0069277, filed on Jun. 2, 2017, and Korean Patent Application No. 10-2017-0169529, filed on Dec. 11, 2017, in the Korean Intellectual Property Office, the disclosures of which are incorporated herein in their entirety by reference.

BACKGROUND

Apparatuses and methods consistent with exemplary embodiments of the inventive concept relate to a semiconductor integrated circuit, and more particularly, to a fingerprint controller for driving a fingerprint sensing array provided in a touchscreen, a method of operating the fingerprint controller, and a driver integrated circuit for driving the touchscreen including the fingerprint sensing array.

As wired/wireless communication technology and smart device-related technology have recently been rapidly developed, a user's fingerprint has been increasingly used to perform user authentication that is one of the security methods for safely using such wired/wireless communication technology and smart device-related technology. In order to optimize the size and ease of use of a mobile device such as a smartphone or a tablet personal computer (PC), there is a demand for an on-display fingerprint sensing array in which a fingerprint sensing array is mounted on a touchscreen (or a display).

SUMMARY

The exemplary embodiments of the inventive concept provide a fingerprint controller for driving a fingerprint sensing array provided in a touchscreen and a method of operating the fingerprint controller, which improves fingerprint sensing performance.

The exemplary embodiments of the inventive concept also provide a driver integrated circuit for driving a touchscreen including a fingerprint sensing array, which may improve displaying performance, fingerprint sensing performance, and touch sensing performance.

According to an exemplary embodiment, there is provided a method of operating a fingerprint controller for driving a fingerprint sensing array included in a touchscreen divided by at least a touch sensing region and a fingerprint sensing region, the method including: receiving a reference timing signal from an external module; driving the fingerprint sensing array based on the reference timing signal; and in response to the reference timing signal, driving the fingerprint sensing array to perform fingerprint sensing at the fingerprint sensing region to generate a fingerprint image, wherein the touchscreen further includes a touch sensing array, configured to be driven to perform touch sensing at the touch sensing region to generate touch data comprising touch coordinates on the touch sensing region, and a display panel configured to be driven to display an image on the touchscreen, and wherein a time point to start the driving the fingerprint sensing array is set to be different from a time point to start the driving the display panel to display the image and a time point to start the driving the touch sensing array to perform the touch sensing.

According to an exemplary embodiment, there is provided a fingerprint controller for driving a fingerprint sensing array included in a touchscreen divided by at least a touch sensing region and a fingerprint sensing region, the fingerprint controller including: a control logic configured to generate a fingerprint sensing timing signal for driving the fingerprint sensing array in synchronization with a reference timing signal provided from an external module; an analog front end configured to drive the fingerprint sensing array in response to the fingerprint sensing timing signal, and convert analog sensing signals output from the fingerprint sensing array into digital values; and a processor configured to generate a fingerprint image or touch data including touch coordinates on the fingerprint sensing region, based on the digital values, wherein the touchscreen further includes a touch sensing array, configured to be driven to perform touch sensing at the touch sensing region to generate touch data including touch coordinates on the touch sensing region, and a display panel configured to be driven to display an image on the touchscreen, and wherein the control logic generates the fingerprint sensing timing signal at a time point different from a time point to start the driving the display panel to display the image and a time point to start the driving the touch sensing array to perform the touch sensing.

According to an exemplary embodiment, there is provided a driver integrated circuit for driving a touchscreen divided into at least a touch sensing region and a fingerprint sensing region and including a display panel, a touch sensing array, and a fingerprint sensing array, the driver integrated circuit including: a touch controller configured to drive the touch sensing array to perform touch sensing at the touch sensing region in synchronization with a first timing signal received from an external module and output touch data as a result of the touch sensing; and a fingerprint controller configured to drive the fingerprint sensing array to perform fingerprint sensing at the fingerprint sensing region in synchronization with the first timing signal and output a fingerprint image as a result of the fingerprint sensing.

BRIEF DESCRIPTION OF THE DRAWINGS

The exemplary embodiments of the inventive concept will be more clearly understood from the following detailed description taken in conjunction with the accompanying drawings in which.

DETAILED DESCRIPTION OF THE EXEMPLARY EMBODIMENTS

Figure 1:
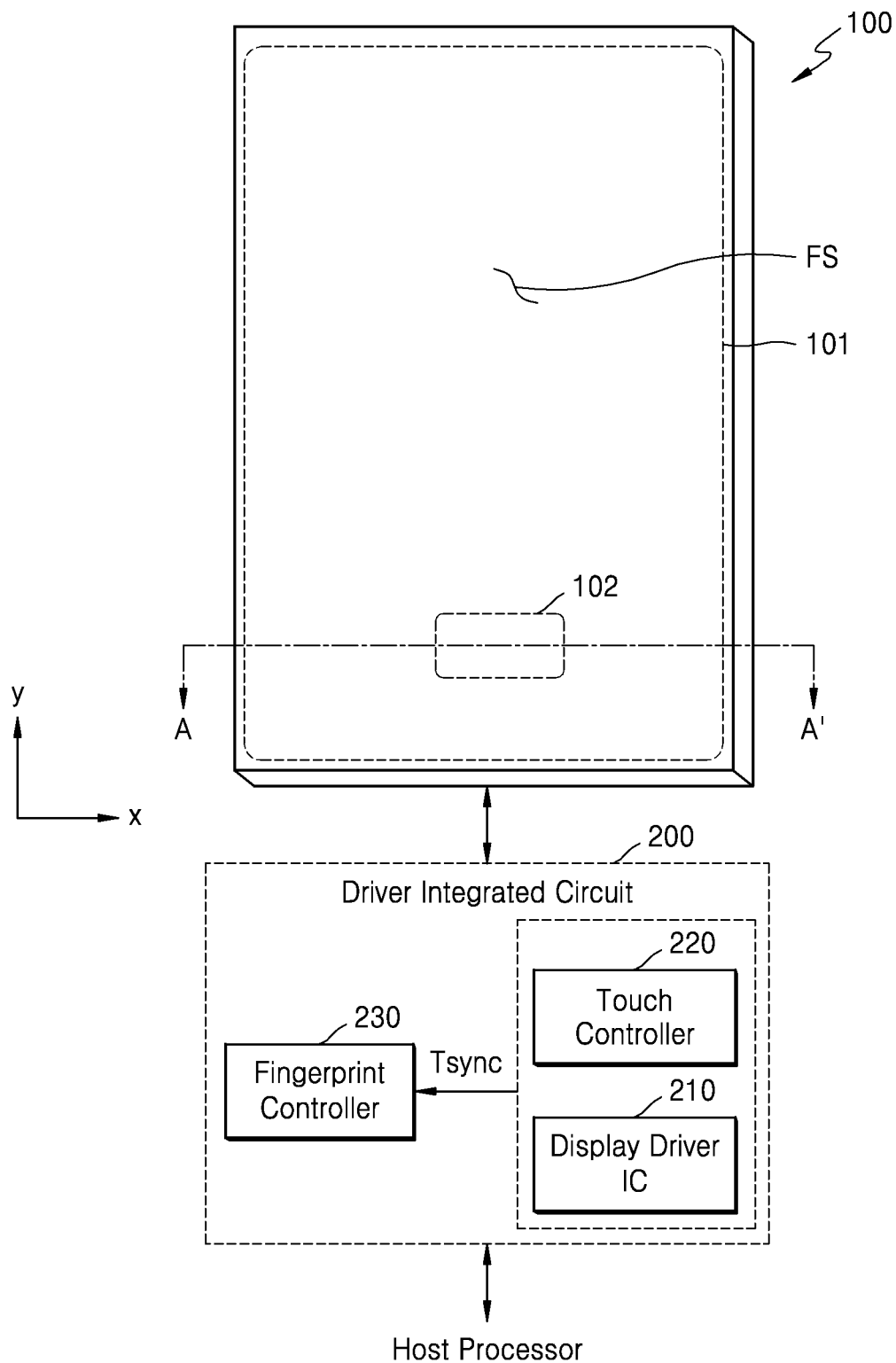
FIG. 1 is a block diagram of a touchscreen apparatus according to an exemplary embodiment.

Various exemplary embodiments of the inventive concept will be described more fully hereinafter with reference to the accompanying drawings. The inventive concept may, however, be embodied in many different forms and should not be construed as limited to the exemplary embodiments set forth herein. Rather, these exemplary embodiments are provided so that this description will be thorough and complete, and will fully convey the scope of the inventive concept to those skilled in the art. In the drawings, the sizes and relative sizes of layers and regions may be exaggerated for clarity.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "over," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, the exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, when an exemplary embodiment can be implemented differently, functions or operations described in a particular block may occur in a different way from a flow described in the flowchart. For example, two consecutive blocks may be performed simultaneously, or the blocks may be performed in reverse according to related functions or operations.

Figure 2A:
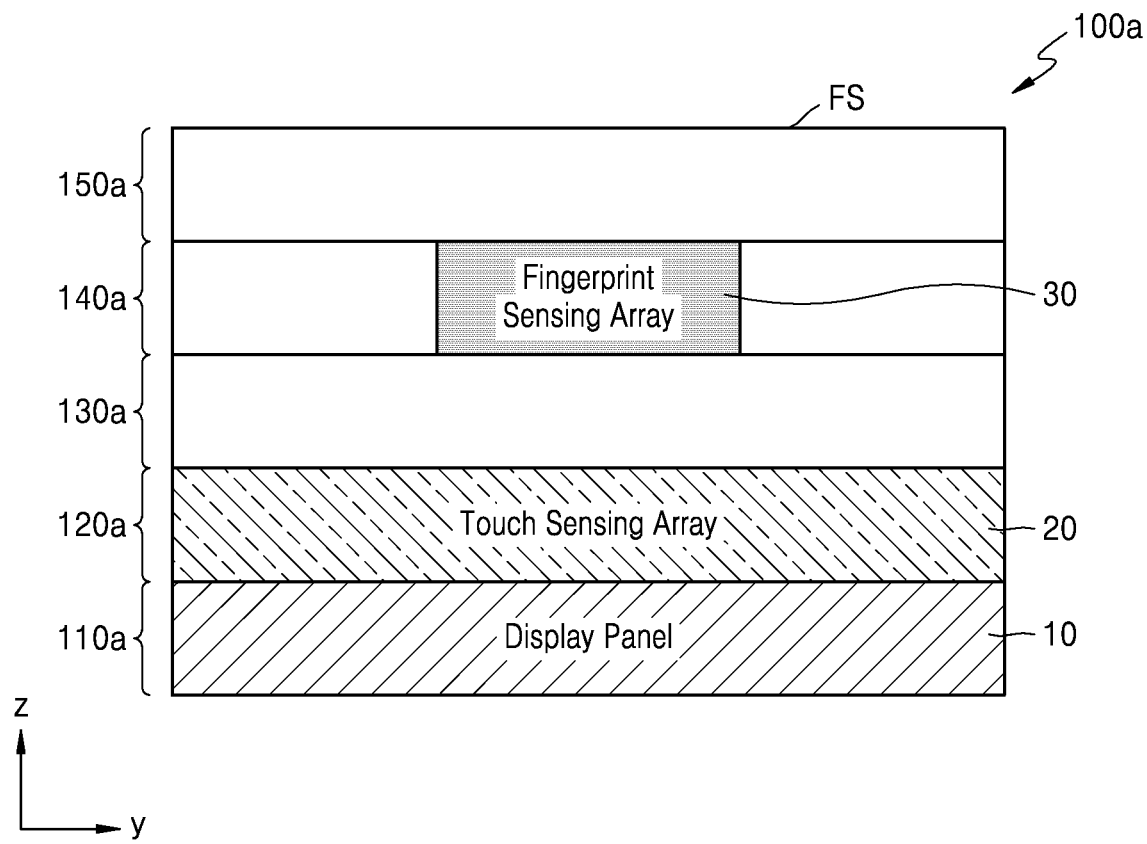
FIGS. 2A through 2C are vertical sectional views taken along line A-A' of a touchscreen of FIG. 1, according to exemplary embodiments.
Figure 2B:
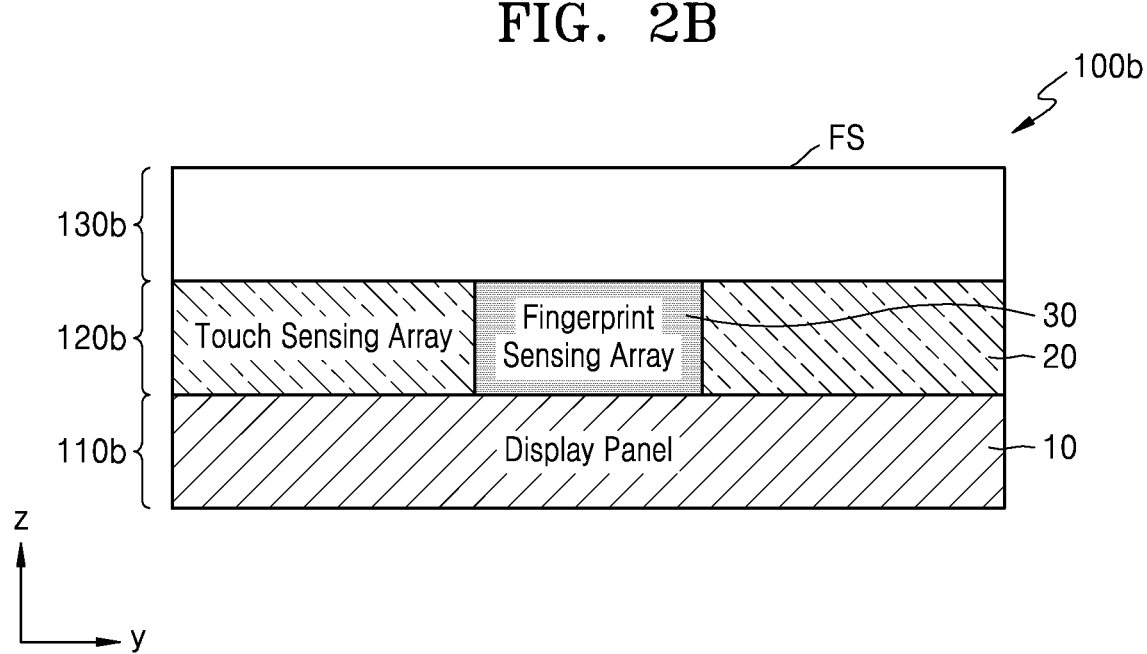
Figure 2C:
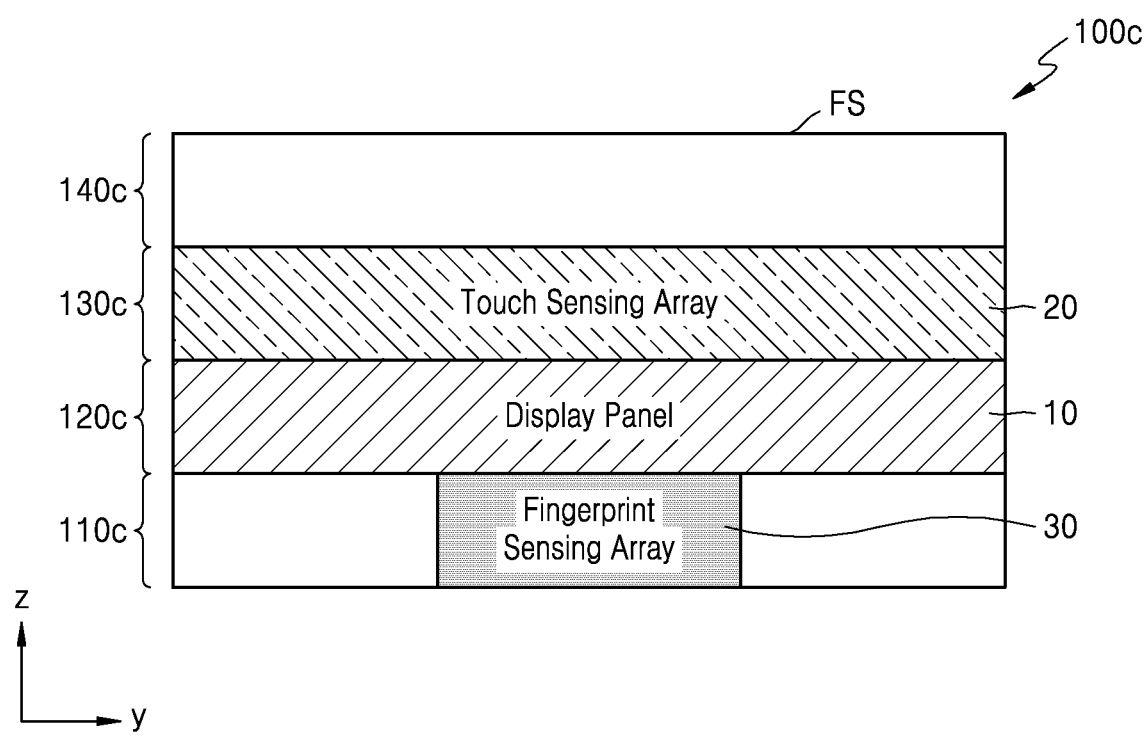

FIG. 1 is a block diagram of a touchscreen apparatus 1000 according to an exemplary embodiment. FIGS. 2A through 2C are vertical sectional views taken along line A-A' of a touchscreen 100 of FIG. 1 according to exemplary embodiments.

The touchscreen apparatus 1000 according to an exemplary embodiment may be a smartphone, a laptop computer, a mobile phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a wearable computer, an Internet of things (IoT) device, an Internet of everything (IoE) device, a drone, or an e-book. However, the inventive concept is not limited thereto, and the touchscreen apparatus 1000 may be an electronic device having a display function, a touch recognition function, and a fingerprint recognition function.

Referring to FIG. 1, the touchscreen apparatus 1000 may include the touchscreen 100 and a driver integrated circuit 200. The driver integrated circuit 200 may include a display driver circuit 210, a touch controller 220, and a fingerprint controller 230. The touchscreen apparatus 1000 may further include a host processor or other elements. For example, when the touchscreen apparatus 1000 is a mobile device, the touchscreen apparatus 1000 may further include an application processor (AP).

The touchscreen 100 may operate as an input/output device of the touchscreen apparatus 1000 by performing displaying, touch sensing, and fingerprint sensing. In an exemplary embodiment, the touchscreen 100 may additionally sense a touch force. The touchscreen 100 may be referred to as a touchscreen panel, a touchscreen stack, or a display stack.

The touchscreen 100 may display an image, and may sense a touch input that occurs on the touchscreen 100. Also, when the touch input is a user's finger, the touchscreen 100 may sense the user's fingerprint. The touch input may include not only a direct contact of a conductive object such as a finger on the touchscreen 100 but also a proximity touch of the conductive object over the touchscreen 100. An entity with which the user may apply a touch input to the touchscreen 100 is defined as an "object". For example, the object may be a conductive object such as, but not limited to, the user's finger or palm, a touch pen, or a stylus pen.

A touch sensing region 101 and a fingerprint sensing region 102 may be located on one surface (e.g., an x-y plane) of the touchscreen 100. The touch sensing region 101 may be a region where an occurrence and a position of a touch input may be detected, and may be substantially the same as a display region where an in image is displayed. The touch sensing region 101 may be a part of or the entire front surface FS (and a rear surface opposite to the front surface FS) of the touchscreen 100. A touch sensing array may be located on the touch sensing region 101. The touch sensing array may be stacked on a display panel or may be integrally formed with the display panel.

The fingerprint sensing region 102 may be a region which, when a touch input occurs, may generate an image corresponding to an object, for example, a fingerprint image when a finger touch is sensed. The fingerprint sensing region 102 may overlap a part of the touch sensing region 101. In other words, a part of the touch sensing region 101 may be the fingerprint sensing region 102. In an exemplary embodiment, both fingerprint sensing and touch sensing may be performed on the fingerprint sensing region 102.

Although one fingerprint sensing region 102 is illustrated in FIG. 1, the inventive concept is not limited thereto and a plurality of the fingerprint sensing regions 102 may overlap the touch sensing region 101. A fingerprint sensing array may be located on the fingerprint sensing region 102.

A structure of the touchscreen 100 will now be described with reference to vertical sectional views of FIGS. 2A through 2C.

Referring to FIGS. 2A through 2C, each of touchscreens 100a, 100b, and 100c may include a display panel 10, a touch sensing array 20, and a fingerprint sensing array 30.

The display panel 10 may display an image based on image signals applied from the driver integrated circuit 200 (see FIG. 1). The display panel 10 may be any one from among a liquid-crystal display (LCD), a light-emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electroluminescent display (ELD), and a vacuum fluorescent display (VFD), or may be another type of flat panel or flexible panel.

The touch sensing array 20 may sense a touch input occurring on the touch sensing region 101, and may provide a touch sensing signal to the touch controller 220.

The touch sensing array 20 may be a capacitive sensing array. The touch sensing array 20 may include touch sensing units located on an x-y plane in rows and columns. The touch sensing units may be sensing electrodes located in the touch sensing array 20. Each of the sensing electrodes may include a transparent conductive material such as indium tin oxide (ITO), indium zinc oxide (IZO), or indium zinc tin oxide (IZTO).

The fingerprint sensing array 30 may sense a user's fingerprint. When the user's finger touches the fingerprint sensing region 102 of the touchscreen 100, the fingerprint sensing array 30 may sense the user's fingerprint and may provide a sensing signal, for example, a fingerprint sensing signal, to the fingerprint controller 230.

The fingerprint sensing array 30 may include fingerprint sensing units located on an x-y plane in rows and columns. In an exemplary embodiment, the fingerprint sensing units may be sensing electrodes located in the fingerprint sensing array 30. Each of the sensing electrodes may include a transparent conductive material such as ITO, IZO, or IZTO. In another exemplary embodiment, the fingerprint sensing units may be a plurality of photoelectric conversion pixels for receiving an optical signal, converting the optical signal into an electrical signal, and outputting the electrical signal.

Referring to FIG. 2A, the display panel 10, the touch sensing array 20, and the fingerprint sensing array 30 may be sequentially stacked toward the front surface FS in a z-direction perpendicular to the x-y plane. The touchscreen 100a may include first through fifth layers 110a through 150a that are sequentially stacked, and the display panel 10, the touch sensing array 20, and the fingerprint sensing array 30 may be respectively formed in the first layer 110a, the second layer 120a, and the fourth layer 140a.

In an exemplary embodiment, an intermediate material (e.g., an insulating material) may be filled in a portion of the fourth layer 140a other than a portion where the fingerprint sensing array 30 is formed. However, the inventive concept is not limited thereto, and in another exemplary embodiment, sensing electrodes may be formed in an entire fingerprint sensing array layer 140, and only fingerprint sensing units, i.e., corresponding sensing electrodes, of the fingerprint sensing region 102 may function as the fingerprint sensing array 30. For example, only the fingerprint sensing units of the fingerprint sensing region 102 may receive a driving signal from the fingerprint controller 230, and may provide a fingerprint sensing signal to the fingerprint controller 230.

The third layer 130a and the fifth layer 150a may be protective layers. For example, the third layer 130a may include a glass substrate. That is, the glass substrate may be located between the touch sensing array 20 and the fingerprint sensing array 30. The fifth layer 150a may include window glass. The window glass may be made of acryl or tempered glass, and may protect the touchscreen 100a from an external impact or a scratch due to repeated touches.

Referring to FIG. 2B, the touch sensing array 20 and the fingerprint sensing array 30 may be stacked on the display panel 10. The touchscreen 100b may include first through third layers 110b, 120b, and 130b, and the display panel 10 may be formed in the first layer 110b and the touch sensing array 20 and the fingerprint sensing array 30 may be formed in the second layer 120b. That is, the touch sensing array 20 and the fingerprint sensing array 30 may be formed in the same layer. The third layer 130b may be a protective layer.

Referring to FIG. 2C, the fingerprint sensing array 30, the display panel 10, and the touch sensing array 20 may be sequentially stacked toward the front surface FS. The fingerprint sensing array 30 may be located under the display panel 10.

In addition, another type of layer (or configuration) may be located over or under the first through fourth layers 110a through 140a. The touchscreen 100c may include first through fourth layers 110c through 140c that are sequentially stacked, and the fingerprint sensing array 30, the display panel 10, and the touch sensing array 20 may be respectively formed in the first layer 110c, the second layer 120c, and the third layer 130c. The fourth layer 140c may be a protective layer. The fingerprint sensing array 30 may be located under the display panel 10. In an exemplary embodiment, the display panel 10 and the touch sensing array 20 may be formed on the same substrate (e.g., a glass substrate), and the fingerprint sensing array 30 may be formed on a different substrate.

Although the touch sensing array 20 and the display panel 10 are formed in different layers in FIGS. 2A through 2C, the inventive concept is not limited thereto and, in an exemplary embodiment, the touch sensing array 20 and the display panel 10 may be formed in the same layer. In other words, the touch sensing array 20 may be integrally formed with the display panel 10. For example, the touch sensing array 20 may be implemented in the display panel 10, and a touch sensing unit provided in the touch sensing array 20 may be implemented by using at least one of various electrodes provided in the display panel 10. For example, the display panel 10 may include a variety of electrodes such as a common electrode, a gate line electrode, and a data line electrode, and the touch sensing array 20 may have at least one of the variety of electrodes as a sensing unit. For example, the common electrode may be used as the sensing unit of the touch sensing array 20.

A structure of the touchscreen 100 (see FIG. 1) has been described with reference to FIGS. 2A through 2C. However, the inventive concept is not limited thereto, and the structure of the touchscreen 100 (see FIG. 1) may be modified in various ways as long as the fingerprint sensing array 30 is stacked on the display panel 10 and/or the touch sensing array 20.

Referring back to FIG. 1, the driver integrated circuit 200 may drive the touchscreen 100.

The display driver circuit 210 may drive the display panel 10. The display driver circuit 210 may drive the display panel 10 by providing image signals to the display panel 10.

The touch controller 220 may perform touch sensing. The touch controller 220 may drive the touch sensing array 20, and may perform touch sensing by receiving touch sensing signals from the touch sensing array 20. The touch controller 220 may generate touch data based on the touch sensing signals received by the touch sensing, and may determine an occurrence of a touch input and a position (i.e., touch coordinates) of the touch input occurring on the touchscreen 100 based on the touch data.

The fingerprint controller 230 may drive the fingerprint sensing array 30, and may perform fingerprint sensing by receiving fingerprint sensing signals from the fingerprint sensing array 30. The fingerprint controller 230 may generate a fingerprint image based on the fingerprint sensing signals received by the fingerprint sensing.

In an exemplary embodiment, the fingerprint controller 230 may generate touch data based on fingerprint sensing signals received by touch sensing on the fingerprint sensing region 102, and may provide the touch data to the touch controller 220. In this case, the touch controller 220 may calculate touch coordinates based on the touch data received by the touch sensing on the touch sensing region 101 and the touch data received by the touch sensing on the fingerprint sensing region 102.

The display driver circuit 210, the touch controller 220, and the fingerprint controller 230 may be formed on different semiconductor chips or the same semiconductor chip. The display driver circuit 210, the touch controller 220, and the fingerprint controller 230 may communicate with a host processor through different communication channels according to a preset interface. However, the inventive concept is not limited thereto, and at least two from among the display driver circuit 210, the touch controller 220, and the fingerprint controller 230 may be formed on the same semiconductor chip. For example, the display driver circuit 210 and the touch controller 220 may be formed on one semiconductor chip. As another example, the touch controller 220 and the fingerprint controller 230 may be formed on one semiconductor chip. At least two configurations formed on one semiconductor chip may communicate with the host processor through the same communication channel or different communication channels.

For example, the preset interface may include any one from among an RGB interface, a serial interface, a mobile display digital interface (MDDI), an inter-integrated circuit ($I^2C$) interface, a serial peripheral interface (SPI), a microcontroller unit (MCU) interface, a mobile industry processor interface (MIPI), an embedded displayport (eDP) interface, a D-subminiature (D-sub) interface, an optical interface, a mobile high-definition link (MHL) interface, and a high-definition multimedia interface (HDMI). The preset interface may include any of various serial or parallel interfaces.

In the driver integrated circuit 200 according to an exemplary embodiment, the fingerprint controller 230 may perform fingerprint sensing in synchronization with a reference timing signal Tsync (or referred to as a synchronization signal) received from the display driver circuit 210 and/or the touch controller 220. The reference timing signal Tsync may be a periodic signal or an aperiodic signal. The touch controller 220 may perform touch sensing in synchronization with a first timing signal received from the display driver circuit 210. For example, the first timing signal may be a display timing signal for driving a display panel.

In an exemplary embodiment, the fingerprint controller 230 may receive a second timing signal output from the touch controller 220 as the reference timing signal Tsync.

For example, the touch controller 220 may output the first timing signal received from the display driver circuit 210 as the second timing signal. The fingerprint controller 230 may perform fingerprint sensing in synchronization with the second timing signal output from the touch controller 220, and thus may perform fingerprint sensing in synchronization with the first timing signal. The fingerprint controller 230 may perform fingerprint sensing after a preset delay time (e.g., a first fingerprint sensing delay time) based on the first timing signal received through the touch controller 220. The touch controller 220 may perform touch sensing after a preset delay time (e.g., a first touch sensing delay time) based on the first timing signal. The first fingerprint sensing delay time and the first touch sensing delay time may be different from each other.

When the display driver circuit 210 does not operate, the touch controller 220 may output a touch sensing timing signal that is internally generated for touch sensing as the second timing signal. Accordingly, the fingerprint controller 230 may perform fingerprint sensing in synchronization with the touch sensing timing signal. For example, the fingerprint controller 230 may perform fingerprint sensing, after a preset second fingerprint sensing delay time, based on the touch sensing timing signal. The first fingerprint sensing delay time and the second fingerprint sensing delay time may be different from each other. Alternatively, the fingerprint controller 230 may perform fingerprint sensing in response to the touch sensing timing signal, and the touch controller 220 may perform touch sensing after a preset second touch sensing delay time based on the touch sensing timing signal. The first touch sensing delay time and the second touch sensing delay time may be different from each other.

Alternatively, the touch controller 220 may output a touch sensing end signal as the second timing signal. The fingerprint controller 230 may perform fingerprint sensing in response to the second timing signal, that is, the touch sensing end signal.

In an exemplary embodiment, the fingerprint controller 230 may receive the first timing signal output from the display driver circuit 210 as the reference timing signal Tsync. That is, the touch controller 220 and the fingerprint controller 230 may respectively perform touch sensing and fingerprint sensing in synchronization with the first timing signal applied from the display driver circuit 210. For example, the touch controller 220 and the fingerprint controller 230 may perform, a sensing operation after each preset delay time, based on the first timing signal. The fingerprint controller 230 may perform fingerprint sensing after a preset delay time (e.g., the first fingerprint sensing delay time) based on the first timing signal, and the touch controller 220 may perform touch sensing after a preset delay time (e.g., the first touch sensing delay time) based on the first timing signal.

In an exemplary embodiment, The fingerprint controller 230 may check an operation state of the touch controller 220 before performing fingerprint sensing, and when it is determined that the touch controller 220 is not in a sensing operation state, may perform touch sensing. For example, the touch controller 220 and the fingerprint controller 230 may check an operation state of each other by detecting a level of a shared signal line. Alternatively, the touch controller 220 and the fingerprint controller 230 may check an operation state of each other by requesting operation state information from each other and receiving the operation state information.

Operations of the display driver circuit 210, the touch controller 220, and the fingerprint controller 230 will be described below in detail with reference to FIGS. 5 through 24.

Since the fingerprint sensing array 30 is stacked on the display panel 10 and/or the touch sensing array 20 as described with reference to FIGS. 2A through 2C, when at least two from among display driving, touch sensing, and fingerprint sensing are simultaneously performed or when operation times overlap, image quality degradation, touch sensing sensitivity reduction, and fingerprint sensing sensitivity reduction may occur due to noise (e.g., displaying noise, touch sensing array driving noise, and fingerprint sensing array driving noise).

However, in the driver integrated circuit 200 according to an exemplary embodiment, the display driver circuit 210, the touch controller 220, and the fingerprint controller 230 may perform, when a different driving operation is not performed, a corresponding driving operation, based on a timing signal indicating an operation point in time of one another. As such, since the display driver circuit 210, the touch controller 220, and the fingerprint controller 230 perform a driving operation in an interval during which there is no noise therebetween through time division, in synchronization with one another, performance degradation may be prevented. Also, since the display driver circuit 210, the touch controller 220, and the fingerprint controller 230 operate in synchronization with one another without intervention of an external host, for example, an AP, a load of the external host may be reduced.

Figure 3A:
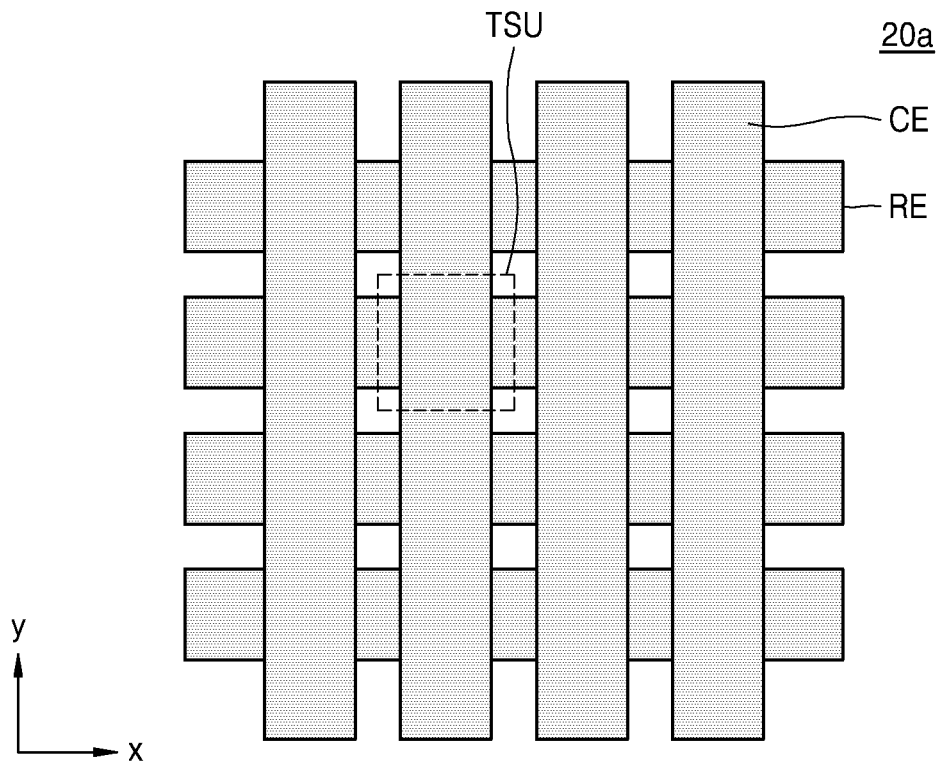
FIGS. 3A and 3B are views of a touch sensing array according to exemplary embodiments.
Figure 3B:
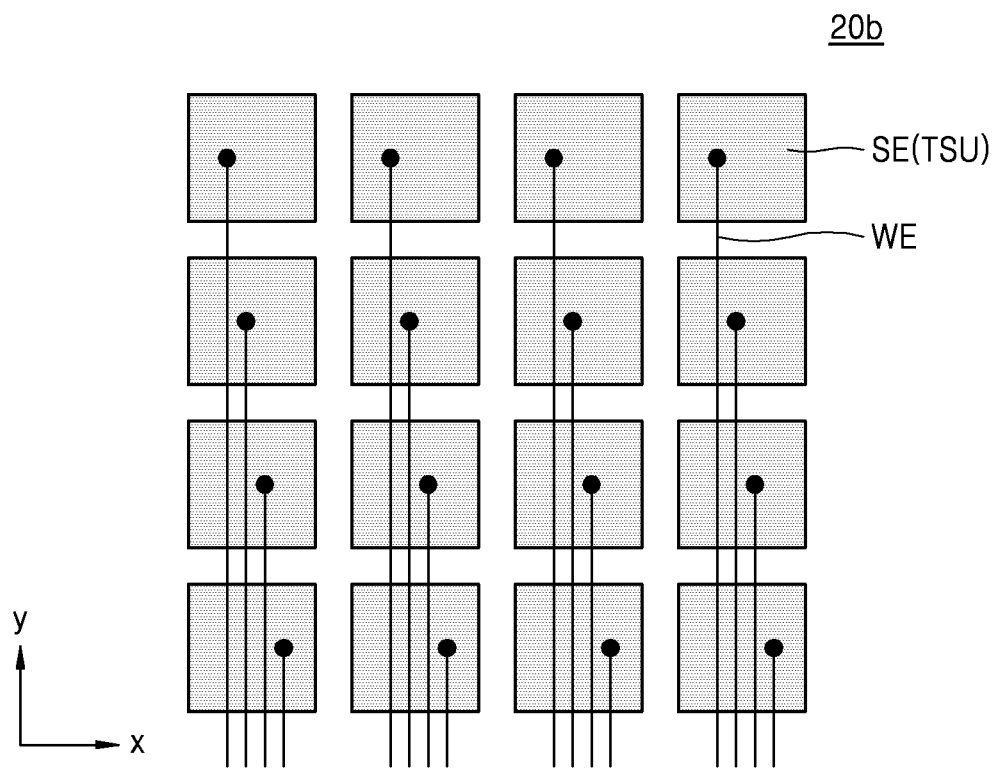

FIGS. 3A and 3B are views of a touch sensing array according to exemplary embodiments.

Referring to FIG. 3A, a touch sensing array 20a may include a plurality of electrodes, for example, row electrodes RE and column electrodes CE, arranged in rows and columns. The number of the row electrodes RE and the number of the column electrodes CE may be determined according to a width and a sensing resolution (e.g., a resolution per unit area) of the touch sensing array 20a. Shapes of the row electrodes RE and the column electrodes CE may be modified in various ways.

The row electrodes RE and the column electrodes CE may intersect each other, and touch sensing units TSU may be formed at intersections. Accordingly, a plurality of the sensing units TSU may be arranged on an x-y plane in rows and columns.

In an exemplary embodiment, the touch sensing array 20a may be driven by using a mutual capacitance sensing method. Mutual capacitance between the row electrodes RE and the column electrodes CE may be output as a sensing signal. For example, the row electrodes RE may be driving electrodes and the column electrodes CE may be sensing electrodes. Driving signals may be sequentially applied to the row electrodes RE, and touch sensing signals may be output from the column electrodes CE. The touch sensing signals may indicate capacitances of the touch sensing units TSU. Accordingly, touch values of positions (i.e., positions on the x-y plane) of the touch sensing units TSU may be determined based on the touch sensing signals output from the touch sensing array 20a. When a touch input of an object occurs on the touch sensing region 101 (see FIG. 1), capacitances of the touch sensing units TSU corresponding to a position where the touch input occurs may be changed, and thus touch values may be changed.

In an exemplary embodiment, the touch sensing array 20a may be driven by using a self-capacitance sensing method. Mutual capacitance between an object and each of the row electrodes RE and the column electrodes CE may be output as a touch sensing signal. Touch driving signals may be respectively applied to the row electrodes RE and the column electrodes CE, and touch sensing signals may be respectively output from the row electrodes RE and the column electrodes CE.

In an exemplary embodiment, the touch sensing array 20a may be driven by using a mutual capacitance sensing method and a self-capacitance sensing method. For example, the touch sensing array 20a may be driven by using a self-capacitance sensing method, and then may be driven by using a mutual capacitance sensing method. Touch values of points respectively corresponding to the touch sensing units TSU may be determined based on touch sensing signals output according to the self-capacitance sensing method and the mutual capacitance sensing method.

Referring to FIG. 3B, a touch sensing array 20b may include sensing electrodes SE that are arranged in rows and columns. The number of the sensing electrodes SE may be determined according to a width and a sensing resolution of the touch sensing array 20b. Shapes of the sensing electrodes SE may be modified in various ways. In an exemplary embodiment, the touch sensing array 20b may be implemented as a common electrode of the display panel 10 (see FIGS. 2A-2C).

The sensing electrodes SE may respectively correspond to the touch sensing units TSU. The sensing electrodes SE may be connected to different wiring electrodes WE. The touch sensing array 20b may be driven by using a self-capacitance sensing method. Mutual capacitance between an object and each of the sensing electrodes SE may be output as a touch sensing signal. Touch driving signals may be respectively applied through the wiring electrodes WE to the sensing electrodes SE, and touch sensing signals generated based on the touch driving signals may be output through the wiring electrodes WE.

Figure 4A:
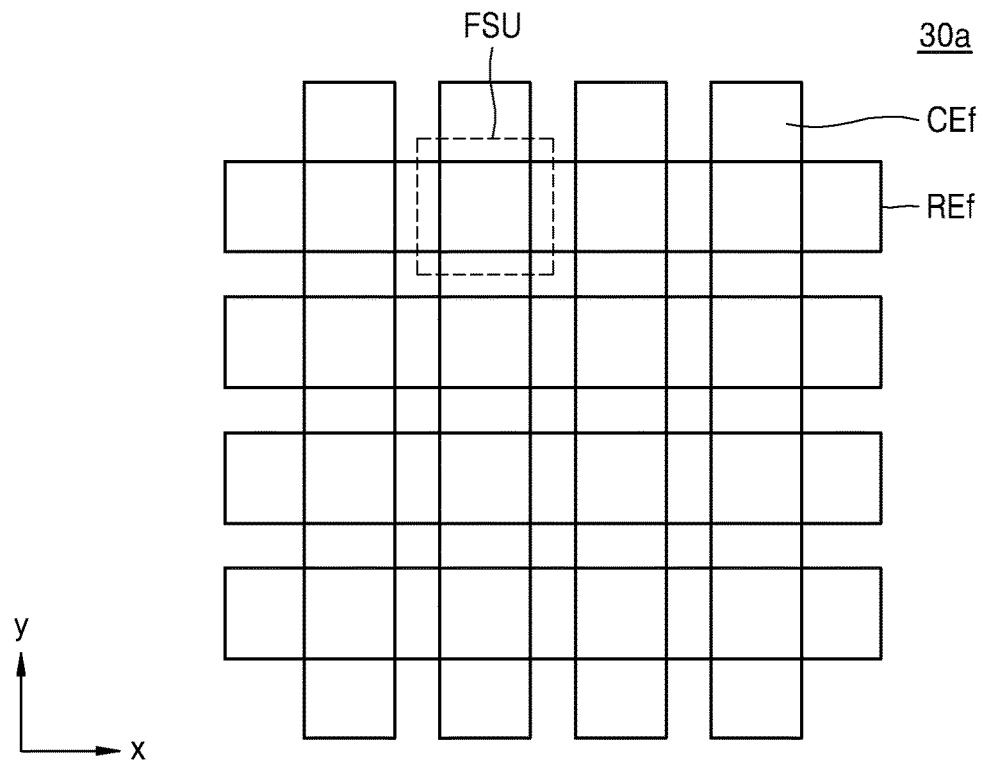
FIGS. 4A and 4B are views of a fingerprint sensing array according to exemplary embodiments.
Figure 4B:
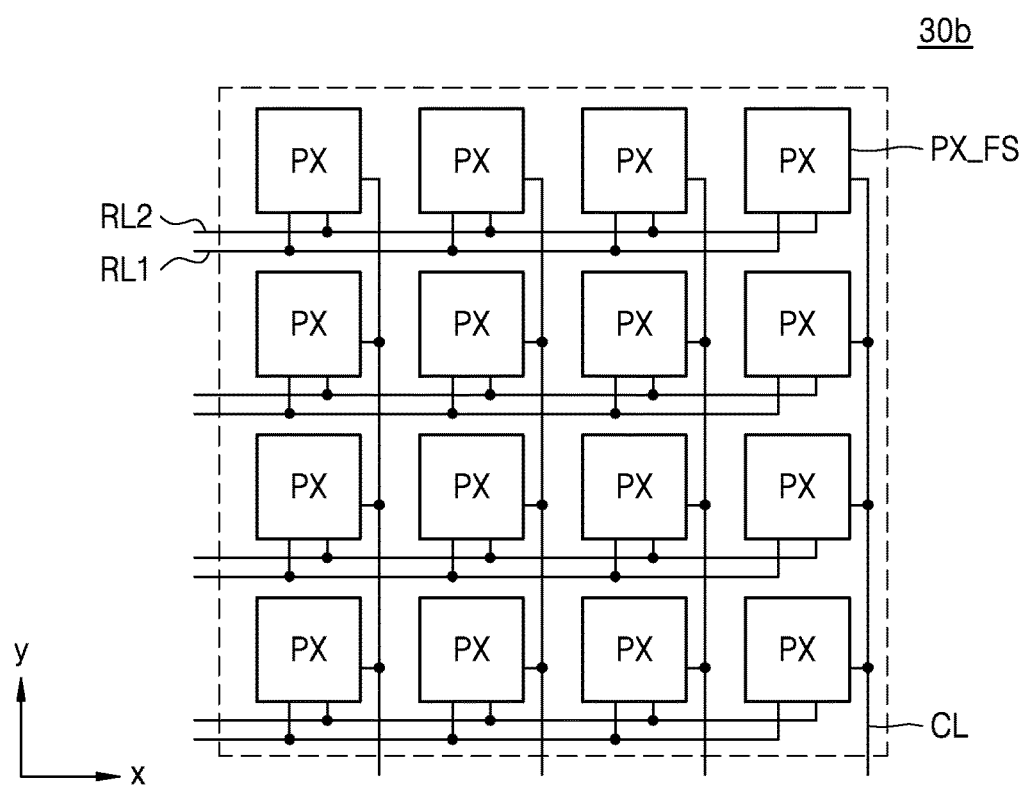

FIGS. 4A and 4B are views of a fingerprint sensing array according to exemplary embodiment.

Referring to FIG. 4A, a fingerprint sensing array 30a may include a plurality of electrodes, for example, row electrodes REf and column electrodes CEf, arranged in rows and columns. The number of the row electrodes REf and the number of the column electrodes CEf may be determined according to an area and a sensing resolution of the fingerprint sensing array 30a. Shapes of the row electrodes REf and the column electrodes CEf may be modified in various ways.

Fingerprint sensing units FSU may be formed at intersections between the row electrodes REf and the column electrodes CEf. Accordingly, a plurality of the fingerprint sensing units FSU may be formed on an x-y plane.

Referring to FIGS. 4A and 3A, a structure of the fingerprint sensing array 30a may be similar to a structure of the touch sensing array 20a of FIG. 3A. However, a pitch between the row electrodes REf and/or a pitch between the column electrodes CEf of the fingerprint sensing array 30a may be less than a pitch between the row electrodes RE and/or the column electrodes CE of the touch sensing array 20a. That is, a sensing resolution (e.g., a resolution per unit area) of the fingerprint sensing array 30a may be greater than a sensing resolution of the touch sensing array 20a.

The fingerprint sensing array 30a may also include sensing electrodes arranged in rows and columns, like the touch sensing array 20b of FIG. 3A, and the sensing electrodes may be connected to different wiring electrodes. The sensing electrodes may correspond to the fingerprint sensing units FSU.

When an object contacts or approaches the touch sensing region 101, capacitances of the plurality of fingerprint sensing units FSU may be changed, and the plurality of fingerprint sensing units FSU may generate electrical signals corresponding to the capacitances, that is, fingerprint sensing signals. The capacitances of the plurality of fingerprint sensing units FSU may vary according to a shape of the object. For example, when the object is a user's finger, each of the plurality of fingerprint sensing units FSU may generate an electrical signal corresponding to a capacitance generated by a ridge of a fingerprint, or may generate an electrical signal corresponding to a capacitance generated by a valley between ridges of the fingerprint.

Referring to FIG. 4B, the fingerprint sensing array 30b may include a plurality of fingerprint sensing pixels PX_FS that are arranged in rows and columns. Each of the plurality of fingerprint sensing pixels PX_FS may be connected to a plurality of row lines, for example, first and second row lines RL1 and RL2, and a column line CL.

Each of the plurality of fingerprint sensing pixels PX_FS may include a photoelectric conversion element (e.g., a photodiode, a phototransistor, a photogate, or a pinned photodiode). When light emitted from a light source (e.g., pixels of the display panel 10 (see FIGS. 2A through 2C)) provided in the touchscreen 100 is reflected by the object, each of the plurality of fingerprint sensing pixels PX_FS may sense reflected light and may generate an electrical signal corresponding to the reflected light, that is, a fingerprint sensing signal. When the object is the user's finger, each of the plurality of fingerprint sensing pixels PX_FS may generate an electrical signal corresponding to light reflected by a ridge or a valley between ridges. The amount of light received by each of the plurality of fingerprint sensing pixels PX_FS may vary according to a shape of the fingerprint by which the light is reflected, and an electrical signal having a level that varies according to the amount of sensed light may be generated.

Figure 5:
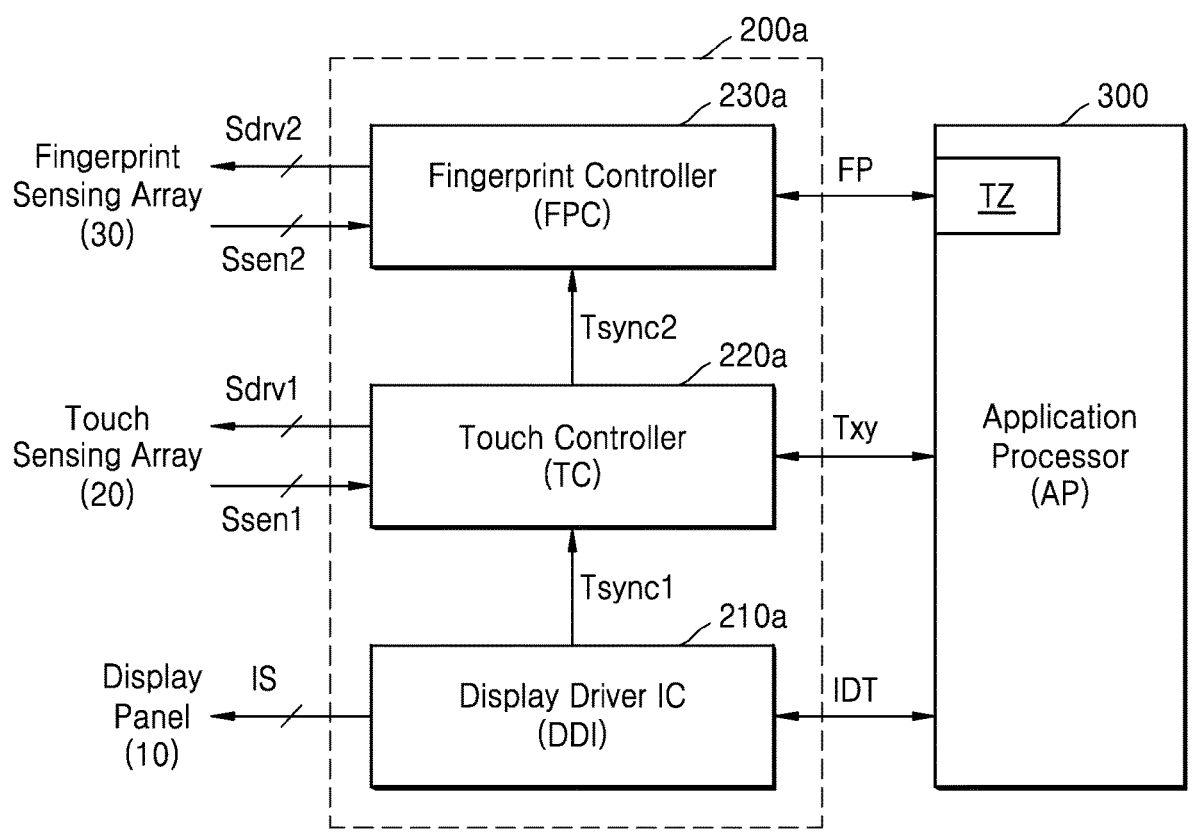
FIG. 5 is a block diagram of a driver integrated circuit according to an exemplary embodiment.

FIG. 5 is a block diagram of a driver integrated circuit 200a according to an exemplary embodiment. For convenience of explanation, an AP 300 is also illustrated.

Referring to FIG. 5, the driver integrated circuit 200a may include a display driver circuit 210a, a touch controller 220a, and a fingerprint controller 230a. The display driver circuit 210a, the touch controller 220a, and the fingerprint controller 230a may communicate with a host processor, for example, the AP 300.

The display driver circuit 210a may display an image on the display panel 10 by converting image data IDT applied from the AP 300 into image signals IS and providing the image signals IS to the display panel 10 in synchronization with a display timing signal, for example, a vertical synchronization signal and a horizontal synchronization signal for displaying. The vertical synchronization signal and the horizontal synchronization signal may be applied from the AP 300 or may be internally generated.

The display driver circuit 210a may output a first timing signal Tsync1 indicating a display point in time. In an exemplary embodiment, the first timing signal Tsync1 may include the display timing signal. For example, the first timing signal Tsync1 may include at least one from among the vertical synchronization signal and the horizontal synchronization signal.

The touch controller 220a may perform touch sensing in synchronization with the first timing signal Tsync1. The touch controller 220a may generate a touch sensing timing signal in synchronization with the first timing signal Tsync1. For example, the touch sensing timing signal may include a vertical synchronization signal and a horizontal synchronization signal for touch sensing.

The touch controller 220a may drive the touch sensing array 20 by providing touch driving signals Sdrv1 to the touch sensing array 20 in response to the touch sensing timing signal, and may receive touch sensing signals Ssen1 generated based on the touch driving signals Sdrv1. The touch controller 220a may generate touch data based on the touch sensing signals Ssen1, and may calculate touch coordinates Txy by analyzing the touch data. The touch controller 220a may determine whether a touch input occurs. The touch controller 220a may provide the touch coordinates Txy to the AP 300. Alternatively, the touch controller 220a may provide the touch data to the AP 300.

The touch controller 220a may output a second timing signal Tsync2. In an exemplary embodiment, the touch controller 220a may output the first timing signal Tsync1 as the second timing signal Tsync2. When the display panel 10 does not operate, that is, when the first timing signal Tsync1 is not received from the display panel 10, the touch controller 220a may output a touch sensing timing signal that is internally generated as the second timing signal Tsync2. For example, the touch controller 220a may output at least one from among the vertical synchronization signal and the horizontal synchronization signal for touch sensing as the second timing signal Tsync2.

In an exemplary embodiment, the touch controller 220a may output a touch sensing end signal as the second timing signal Tsync2.

The fingerprint controller 230a may perform fingerprint sensing in synchronization with the second timing signal Tsync2 received from the touch controller 220a. The fingerprint controller 230a may generate a fingerprint sensing timing signal in synchronization with the second timing signal Tsync2. For example, the fingerprint sensing timing signal may include a vertical synchronization signal and a horizontal synchronization signal for fingerprint sensing.

The fingerprint controller 230a may drive the fingerprint sensing array 30 by providing fingerprint driving signals Sdrv2 to the fingerprint sensing array 30 in response to the fingerprint sensing timing signal, and may receive fingerprint sensing signals Ssen2 generated based on the fingerprint driving signals Sdrv2. The fingerprint controller 230a may generate a fingerprint image FP based on the fingerprint sensing signals Ssen2. In an exemplary embodiment, the fingerprint controller 230a may generate touch data based on the fingerprint sensing signals Ssen2. The fingerprint controller 230a may provide the fingerprint image FP or the touch data to the AP 300. In an exemplary embodiment, the fingerprint controller 230a may provide the fingerprint image FP to a security region TZ of the AP 300. The AP 300 may include a general environment (e.g., a rich execution environment REE) and a security environment (e.g., a trusted execution environment TEE), and the security environment may be applied to the security region TZ.

As described above, in the driver integrated circuit 200a according to an exemplary embodiment of FIG. 5, the touch controller 220a may perform touch sensing in synchronization with the first timing signal Tsync1 received from the display driver circuit 210a, and the fingerprint controller 230a may perform fingerprint sensing in synchronization with the second timing signal Tsync2 received from the touch controller 220a. Since the display driver circuit 210a, the touch controller 220a, and the fingerprint controller 230a operate in synchronization with one another, display driving, touch sensing, and fingerprint sensing may be performed through time division. That is, a time during which the display driver circuit 210a drives the display panel 10, a time during which the touch controller 220a drives the touch sensing array 20, and a time during which the fingerprint controller 230a drives the fingerprint sensing array 30 may not overlap one another.

Figure 6A:
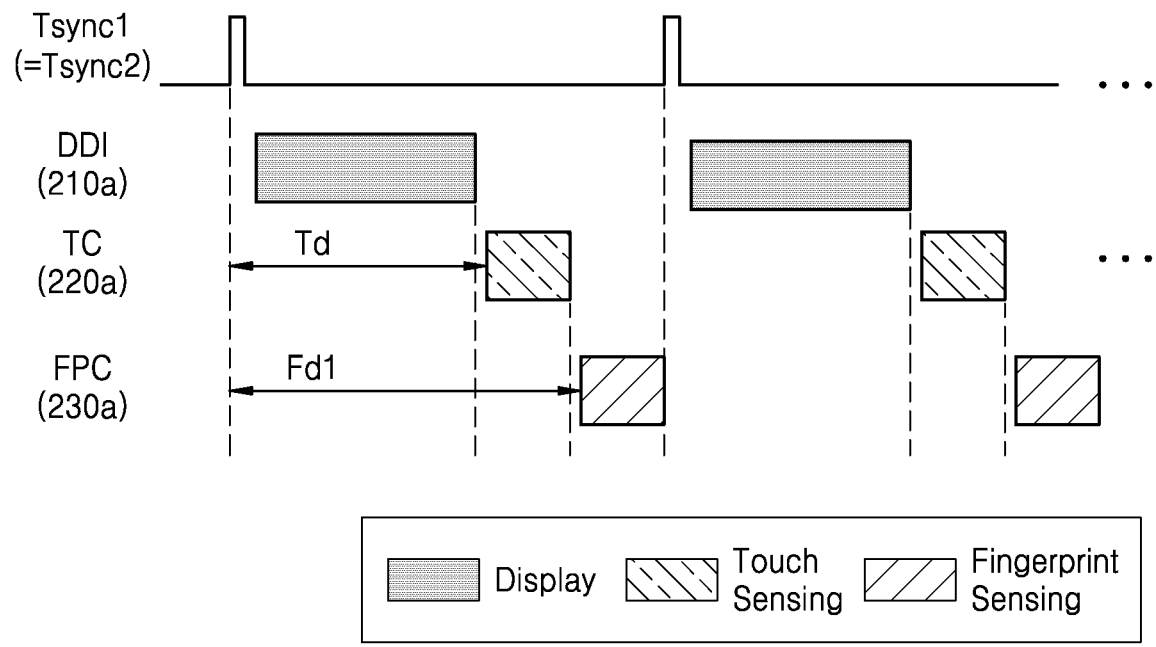
FIGS. 6A through 6C are timing diagrams for explaining a method of operating a display driver circuit of FIG. 5 according to an exemplary embodiment.
Figure 6B:
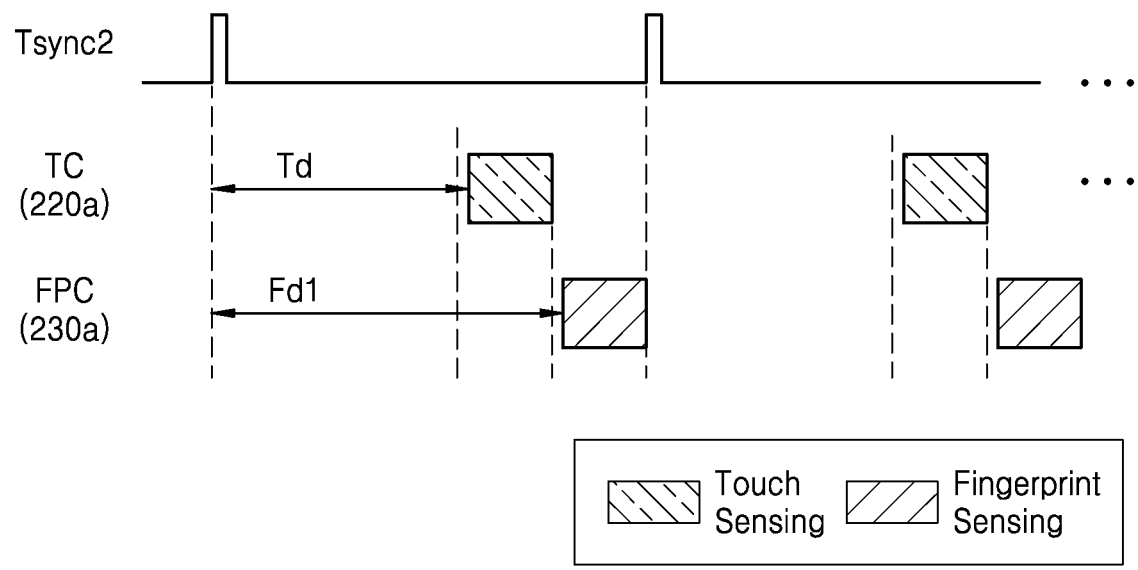
Figure 6C:
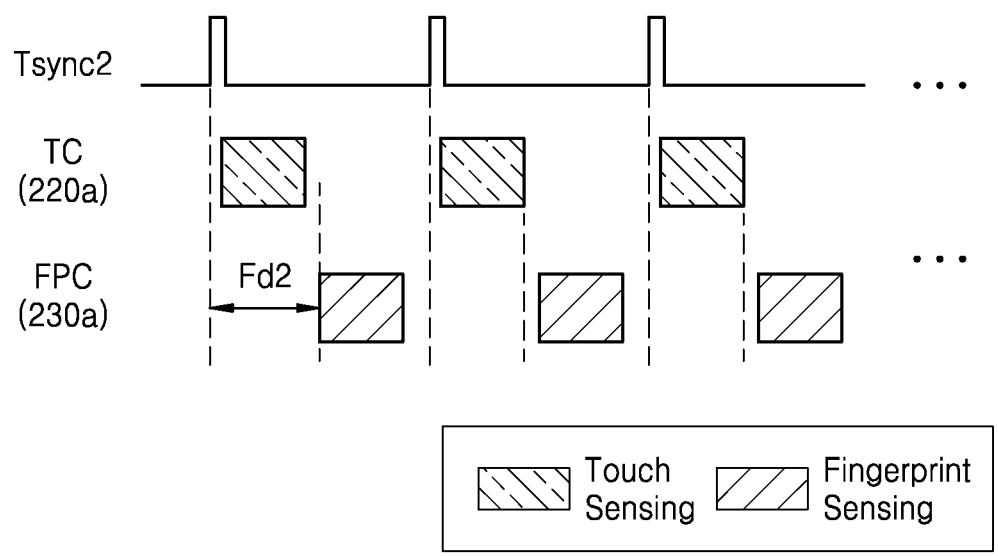

FIGS. 6A through 6C are timing diagrams for explaining a method of operating the display driver circuit 210a of FIG. 5 according to an exemplary embodiment. FIG. 6A illustrates an example where the touch controller 220a outputs the first timing signal Tsync1 as the second timing signal Tsync2, and FIGS. 6B and 6C illustrate an example where the touch controller 220a outputs a touch timing signal that is internally generated as the second timing signal Tsync2.

Referring to FIG. 6A, the display driver circuit 210a may perform displaying in response to the first timing signal Tsync1. For example, the display driver circuit 210a may output image signals to the display panel 10 (see FIG. 2) in response to the first timing signal Tsync1. That is, the display driver circuit 210a may start display driving at a time when a pulse of the first timing signal Tsync1 is generated.

The touch controller 220a may perform touch sensing, after a touch sensing delay time Td that is preset, based on the first timing signal Tsync1. For example, the touch controller 220a may start touch sensing after the touch sensing delay time Td from a time when the pulse of the first timing signal Tsync1 is generated, that is, from a time when a rising edge or a falling edge of the first timing signal Tsync1 is generated. The touch sensing delay time Td may be set considering a displaying interval, that is, an interval during which the display driver circuit 210a applies the image signal to the display panel 10 (see FIGS. 2A through 2C). Accordingly, touch sensing may be performed after displaying is performed. For example, touch sensing may be performed after displaying ends, as shown in FIG. 6A. However, the inventive concept is not limited thereto, and in an exemplary embodiment, a displaying interval and a touch sensing interval may partially overlap each other. For example, the touch sensing interval may be set to start before the displaying interval ends so that driving the touch sensing array 20 may start before the displaying driving ends in each cycle of the first timing signal Tsync1.

The fingerprint controller 230a may perform fingerprint sensing, after a first fingerprint sensing delay time Fd1 that is preset, based on the second timing signal Tsync2 that is substantially the same as the first timing signal Tsync1. For example, the fingerprint controller 230a may start fingerprint sensing after the first fingerprint sensing delay time Fd1 from a time when the pulse of the first timing signal Tsync1 is generated, that is, from a time when the rising edge or the falling edge of the first timing signal Tsync1 is generated. The first fingerprint sensing delay time Fd1 may be different from the touch sensing delay time Td, and may be set considering a displaying interval and a touch sensing interval. Accordingly, fingerprint sensing may be performed after touch sensing is performed. For example, as shown in FIG. 6A, fingerprint sensing may be performed after touch sensing ends. However, the inventive concept is not limited thereto, and in an exemplary embodiment, a touch sensing interval and a fingerprint sensing interval may partially overlap each other. For example, the fingerprint sensing interval may be set to start before the touch sensing interval ends so that driving the fingerprint sensing array 30 may start before the touch sending driving ends in each cycle of the first timing signal Tsync1.

The first timing signal Tsync1 may be a periodic signal, and each of display driving, touch sensing, and fingerprint sensing may be periodically performed in synchronization with the first timing signal Tsync1. The display driver circuit 210a, the touch controller 220a, and the fingerprint controller 230a may respectively perform display driving, touch sensing, and fingerprint sensing through time sharing by sharing one cycle of the first timing signal Tsync1 based on the first timing signal Tsync1. In this case, as described above, since the touch controller 220a and the fingerprint controller 230a perform touch sensing and fingerprint sensing after the touch sensing delay time Td and the first fingerprint sensing delay time Fd1, display driving, touch sensing, and fingerprint sensing may be performed in an interval during which there is no noise according to operations of other elements.

Referring to FIG. 6B, when the display driver circuit 210a does not operate, that is, when the first timing signal Tsync1 is not received by the touch controller 220a, the touch controller 220a may internally generate a touch sensing timing signal, and may output the touch sensing timing signal as the second timing signal Tsync2. The touch controller 220a and the fingerprint controller 230a may operate in synchronization with the second timing signal Tsync2.

In an exemplary embodiment, the touch controller 220a may generate a touch sensing timing signal, that is, the second timing signal Tsync2, having a cycle that is substantially the same as a cycle of the pulse of the first timing signal Tsync1. In other words, the touch controller 220a may generate the second timing signal Tsync2 by simulating the first timing signal Tsync1. For example, when the first timing signal Tsync1 is received, the touch controller 220a may store a cycle of the pulse of the first timing signal Tsync1 and may generate the second timing signal Tsync2 based on the cycle. However, the inventive concept is not limited thereto, and in another exemplary embodiment, the touch controller 220a may generate the second timing signal Tsync2 based on a preset cycle.

The touch controller 220a may perform touch sensing, after the touch sensing delay time Td, based on the second timing signal Tsync2. The fingerprint controller 230a may perform fingerprint sensing, after the first fingerprint sensing delay time Fd1, based on the second timing signal Tsync2.

Referring to FIG. 6C, when the display driver circuit 210a does not operate, the touch controller 220a and the fingerprint controller 230a may operate in synchronization with a touch sensing timing signal that is internally generated, that is, the second timing signal Tsync2. Unlike in FIG. 6B, the touch controller 220a may perform touch sensing in response to the touch sensing timing signal, that is, the second timing signal Tsync2, without a delay.

The fingerprint controller 230a may perform fingerprint sensing after a second fingerprint sensing delay time Fd2 that is preset, based on the second timing signal Tsync2. The second fingerprint sensing delay time Fd2 may be set considering a touch sensing interval. Accordingly, fingerprint sensing may be performed after touch sensing is performed. The second fingerprint sensing delay time Fd2 may be different from the fingerprint sensing delay time Fd1 of FIG. 6A.

Like in FIG. 6A, since touch sensing and fingerprint sensing are periodically performed in synchronization with the second timing signal Tsync2, the touch sensing and the fingerprint sensing may be performed by sharing one cycle of the second timing signal Tsync2, and the fingerprint sensing may be performed in an interval during which the touch sensing is not performed, based on the second fingerprint sensing delay time Fd2.

Figure 7A:
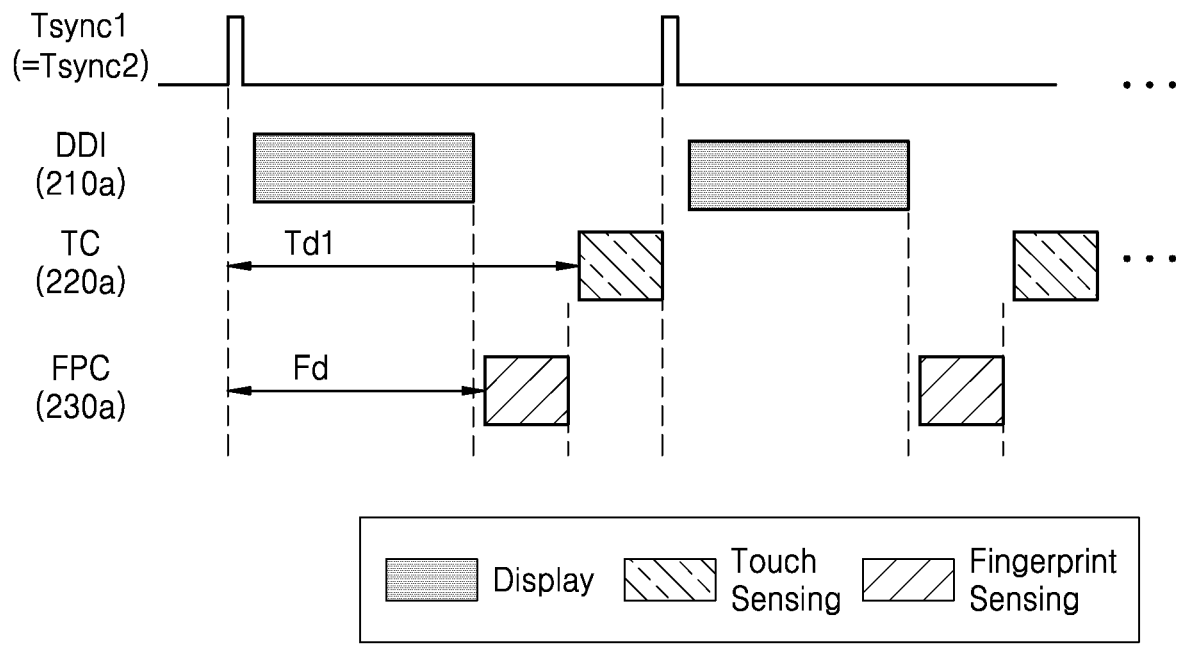
FIGS. 7A through 7C are timing diagrams for explaining a method of operating the display driver circuit of FIG. 5, according to an exemplary embodiment.
Figure 7B:
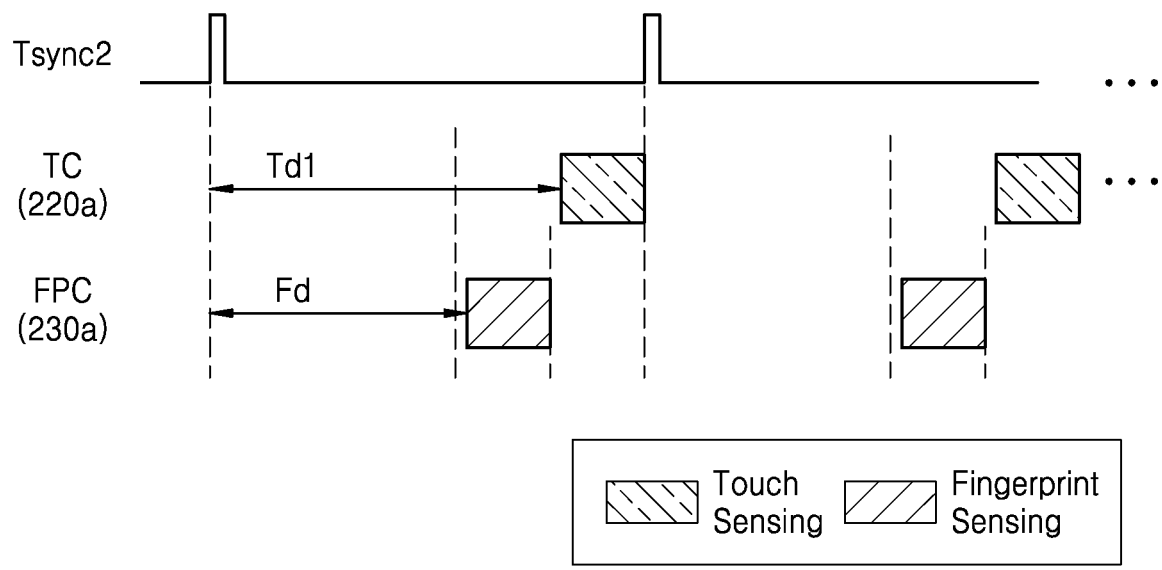
Figure 7C:
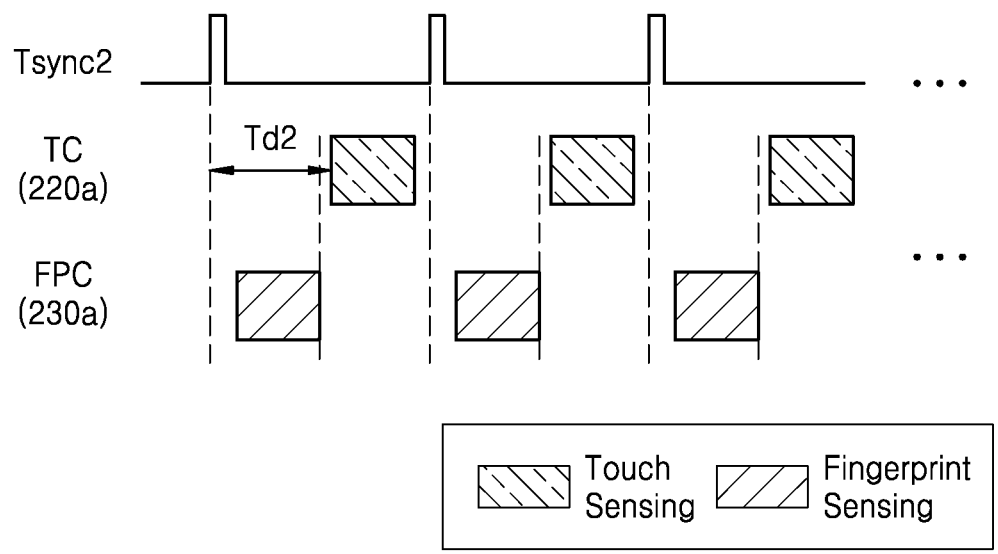

FIGS. 7A through 7C are timing diagrams for explaining a method of operating the display driver circuit 210a of FIG. 5 according to an exemplary embodiment. FIG. 7A illustrates an example where the touch controller 220a outputs the first timing signal Tsync1 as the second timing signal Tsync2. FIG. 7B illustrates an example where the touch controller 220a outputs a touch timing signal that is internally generated as the second timing signal Tsync2. The method of FIGS. 7A and 7B will be described by focusing on a difference from the method of FIGS. 6A through 6C.

Referring to FIG. 7A, the touch controller 220a may perform touch sensing, after a first touch sensing delay time Td1 that is preset, based on the first timing signal Tsync1, and the fingerprint controller 230a may perform fingerprint sensing after a fingerprint sensing delay time Fd that is preset, based on the first timing signal Tsync1. The first touch sensing delay time Td1 and the fingerprint sensing delay time Fd may be different from each other, and the first touch sensing delay time Td1 may be greater than the fingerprint sensing delay time Fd. For example, the fingerprint sensing delay time Fd may be set considering a displaying interval, and the first touch sensing delay time Td1 may be set considering the displaying interval and a fingerprint sensing interval. Accordingly, fingerprint sensing may be performed after displaying is performed, and touch sensing may be performed after the fingerprint sensing is performed.

Referring to FIG. 7B, when the display driver circuit 210a does not operate, the touch controller 220a may internally generate a touch sensing timing signal, and may output the touch sensing timing signal as the second timing signal Tsync2. The touch controller 220a and the fingerprint controller 230a may operate in synchronization with the second timing signal Tsync2.

The fingerprint controller 230a may perform fingerprint sensing after the fingerprint sensing delay time Fd based on the second timing signal Tsync2, and the touch controller 220a may perform touch sensing, after the first touch sensing delay time Td1 based on the second timing signal Tsync2.

Referring to FIG. 7C, when the display driver circuit 210a does not operate, the touch controller 220a and the fingerprint controller 230a may operate in synchronization with a touch sensing timing signal that is internally generated by the touch controller 220a, that is, the second timing signal Tsync2.

The fingerprint controller 230a may perform fingerprint sensing, in response to the second timing signal Tsync2, without a delay, and the touch controller 220a may perform touch sensing, after a second touch sensing delay time Td2 that is preset, based on the second timing signal Tsync2. The second touch sensing delay time Td2 may be different from the first touch sensing delay time Td1 of FIG. 7A, and may be set considering an fingerprint sensing interval.

Figure 8A:
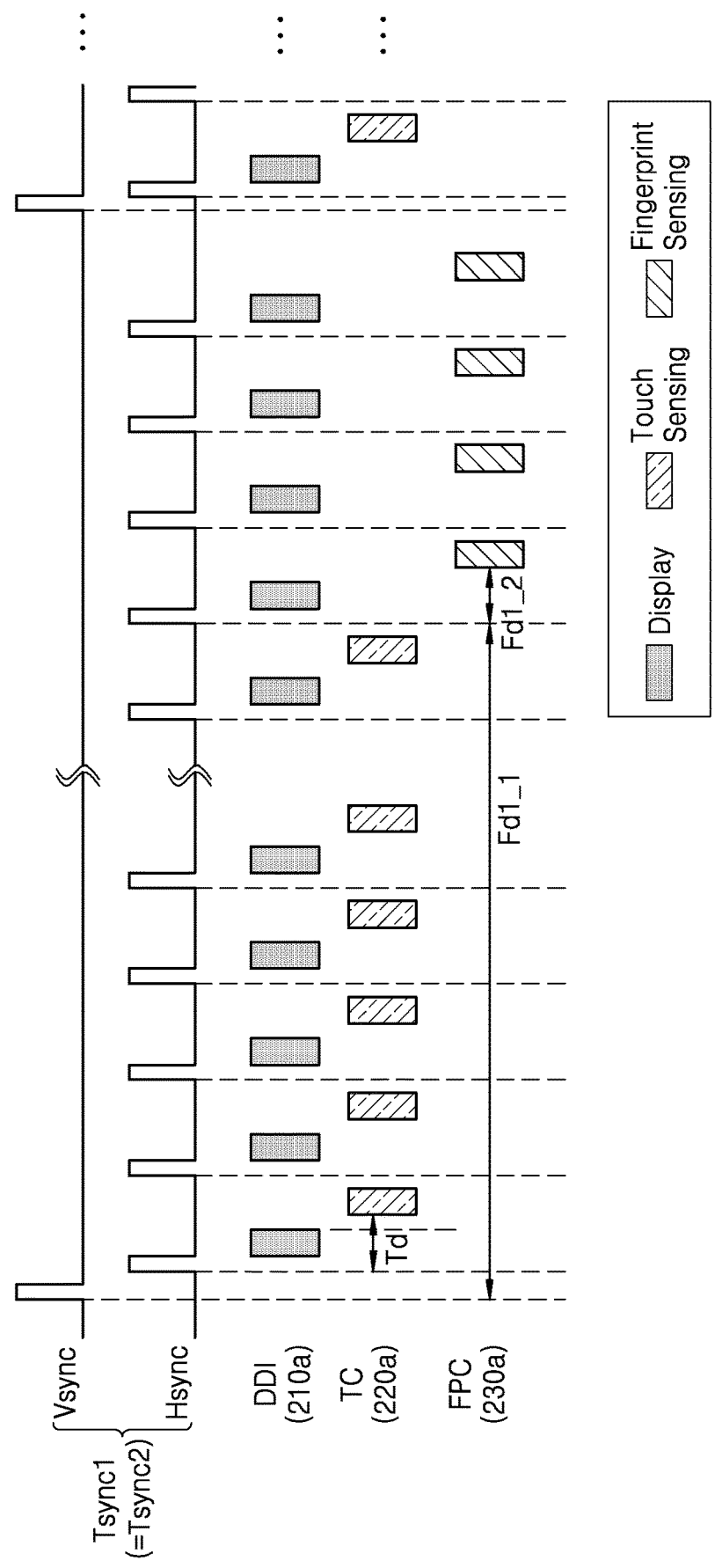
FIGS. 8A and 8B are timing diagrams for explaining a method of operating the display driver circuit of FIG. 5, according to an exemplary embodiment.
Figure 8B:
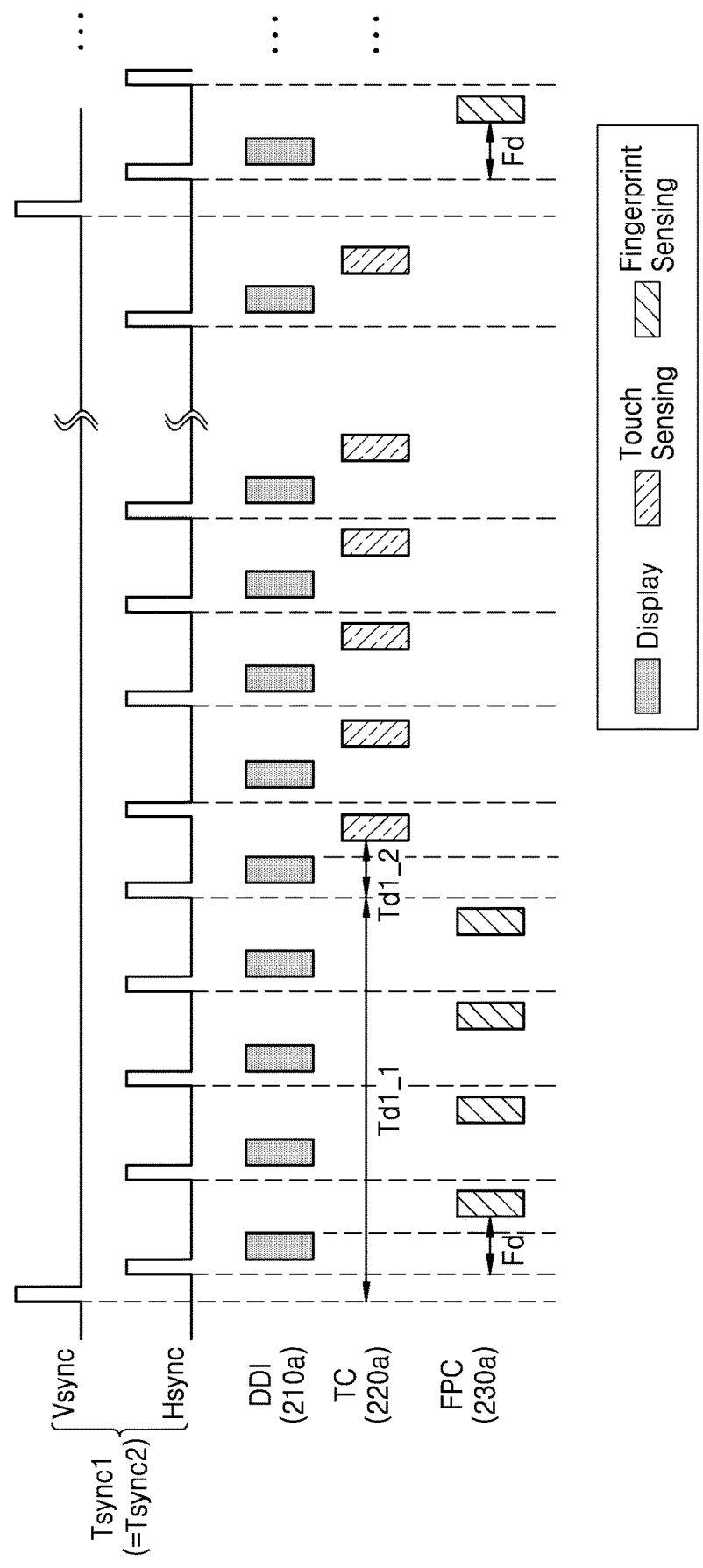

FIGS. 8A and 8B are timing diagrams for explaining a method of operating the display driver circuit 210a of FIG. 5 according to an exemplary embodiment.

Referring to FIGS. 8A and 8B, the display driver circuit 210a may output a vertical synchronization signal Vsync and a horizontal synchronization signal Hsync for display driving as the first timing signal Tsync1.

The display driver circuit 210a may perform displaying in synchronization with the vertical synchronization signal Vsync and the horizontal synchronization signal Hsync. The vertical synchronization signal Vsync may indicate that one frame of the display panel 10 (see FIGS. 2A through 2C) starts, and the horizontal synchronization signal Hsync may indicate that a horizontal driving interval for driving pixels of one row from among a plurality of rows included in the one frame starts. As shown in FIGS. 8A and 8B, in one cycle of the vertical synchronization signal Vsync, displaying may be performed in response to each horizontal synchronization signal Hsync. The touch controller 220a and the fingerprint controller 230a may perform touch sensing in synchronization with the vertical synchronization signal Vsync and the horizontal synchronization signal Hsync of the first timing signal Tsync1.

Referring to FIG. 8A, the touch controller 220a may start touch sensing in response to the vertical synchronization signal Vsync. The touch controller 220a may perform touch sensing, after the touch sensing delay time Td that is preset, based on each horizontal synchronization signal Hsync. As shown in FIG. 8A, when a pulse of the vertical synchronization signal Vsync is generated, the touch controller 220a may perform touch sensing after the touch sensing delay time Td from a time when the pulse of the horizontal synchronization signal Hsync is generated, in synchronization with each horizontal synchronization signal Hsync.

The fingerprint controller 230a may start fingerprint sensing after a fingerprint sensing delay time Fd1_1 that is set for the vertical synchronization signal Vsync, based on the vertical synchronization signal Vsync. The fingerprint sensing delay time Fd1_1 may be set considering an interval between a time when touch sensing starts and a time when the touch sensing ends in a touch sensing interval, that is, in one cycle of the vertical synchronization signal Vsync. The fingerprint controller 230a may perform fingerprint sensing, after a fingerprint sensing delay time Fd1_2 that is set for the horizontal synchronization signal Hsync, based on each horizontal synchronization signal Hsync, after the fingerprint sensing delay time Fd1_1. As shown in FIG. 8A, the fingerprint controller 230a may perform fingerprint sensing after a fingerprint sensing delay time Fd1_2 from a time when a pulse of the horizontal synchronization signal Hsync is generated in synchronization with each horizontal synchronization signal Hsync, after the fingerprint sensing delay time Fd1_1 from a time when the pulse of the vertical synchronization single Vsync is generated.

As described above, touch sensing may be performed prior to the fingerprint sensing, in one cycle of the vertical synchronization signal Vsync.

Referring to FIG. 8B, the touch controller 220a may start touch sensing after a touch sensing delay time Td1_1 that is set for the vertical synchronization signal Vsync, based on the vertical synchronization signal Vsync, and the fingerprint controller 230a may start fingerprint sensing in response to the vertical synchronization signal Vsync. The touch sensing delay time Td1_1 may be set considering an interval between a time when fingerprint sensing starts and a time when the fingerprint sensing ends in one cycle of the vertical synchronization signal Vsync.

When touch sensing starts, the touch controller 220a may perform touch sensing, after a touch sensing delay time Td1_2 that is preset, based on each horizontal synchronization signal Hsync. When fingerprint sensing starts, the fingerprint controller 230a may perform fingerprint sensing, after the fingerprint sensing delay time Fd that is preset, based on each horizontal synchronization signal Hsync.

As described above, touch sensing may be performed prior to fingerprint sensing, in one cycle of the vertical synchronization signal Vsync.

Figure 9:
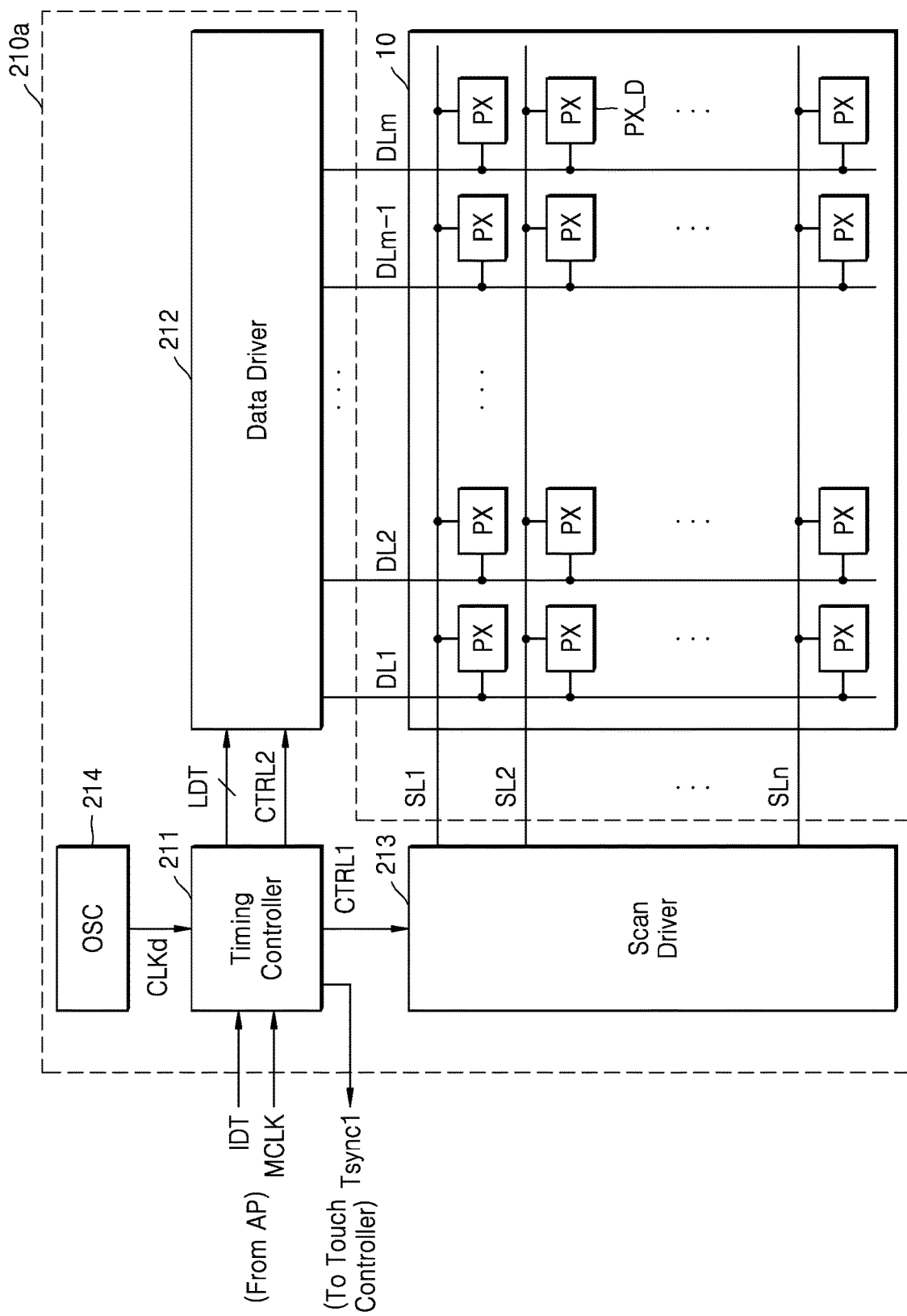
FIG. 9 is a block diagram of the display driver circuit according to an exemplary embodiment.

FIG. 9 is a block diagram of the display driver circuit 210a according to an exemplary embodiment. For convenience of explanation, the display panel 10 is also illustrated.

The display panel 10 may include data lines DL1 through DLm, scan lines SL1 through SLn, and a plurality of display pixels PX_D that are arranged in rows and columns and are connected to the data lines DL1 through DLm and the scan lines SL1 through SLn. The display panel 10 may display images in units of frames.

The display driver circuit 210a may include a timing controller 211, a data driver 212, a scan driver 213, and an oscillator 214. The display driver circuit 210a may further include a voltage generating circuit (not shown) and an image signal processing circuit (not shown).

The timing controller 211 may control an overall operation of the display driver circuit 210a. The timing controller 211 may receive image data IDT and control signals applied from the AP 300 (see FIG. 5), for example, a clock signal MCLK, a vertical synchronization signal, and a horizontal synchronization signal, and may generate a data control signal CTRL2 and a scan control signal CTRL1 for controlling driving timings of the data driver 212 and the scan driver 213 based on the received control signals. Also, the timing controller 211 may provide the image data IDT to the data driver 212 in units of lines.

The timing controller 211 may output the first timing signal Tsync1, and the first timing signal Tsync1 may be applied to the touch controller 220a (see FIG. 5). In an exemplary embodiment, the timing controller 211 may generate a vertical synchronization signal and a horizontal synchronization signal based on an internal clock signal generated by the oscillator 214 or the clock signal MCLK received from the AP 300, and may output the vertical synchronization signal and the horizontal synchronization signal as the first timing signal Tsync1. Alternatively, the timing controller 211 may output a vertical synchronization signal and a horizontal synchronization signal received from the AP 300 as the first timing signal Tsync1.

The scan driver 213 may sequentially select the scan lines SL1 through SLn, in response to the scan control signal CTRL1 applied from the timing controller 211, and the data driver 212 may convert line data LDT into image signals that are analog signals, in response to the data control signal CTRL2 applied from the timing controller 211, and may provide the image signals to the data lines DL1 through DLm. Accordingly, the plurality of display pixels PX_d (PX_D) of the display panel 10 may be driven in units of rows.

Figure 10:
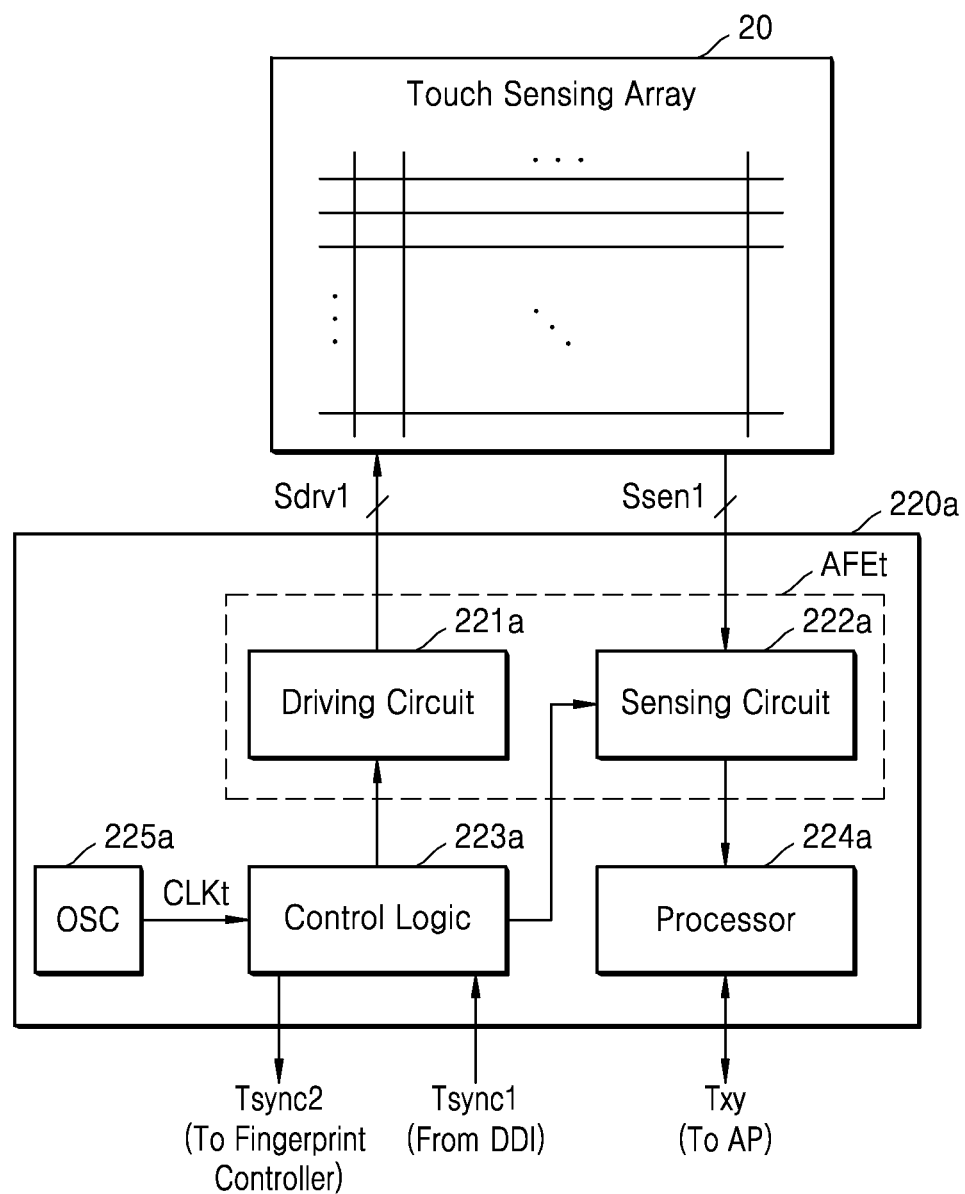
FIG. 10 is a block diagram of a touch controller according to an exemplary embodiment.

FIG. 10 is a block diagram of the touch controller 220a according to an exemplary embodiment.

Referring to FIG. 10, the touch controller 220a may include a driving circuit 221a, a sensing circuit 222a, a control logic 223a, a processor 224a, and an oscillator 225a. The touch controller 220a may further include an interface circuit (not shown) for communicating with an external apparatus or module, and a voltage generating circuit (not shown).

The driving circuit 221a may drive the touch sensing array 20 by providing the touch driving signals Sdrv1 to electrodes of the touch sensing array 20. The sensing circuit 222a may receive the touch sensing signal Ssen1 applied from the touch sensing array 20, and may convert the touch sensing signals Ssen1 that are analog signals into touch values that are digital signals. The driving circuit 221a and the sensing circuit 222a may constitute an analog front end AFEt of the touch controller 220a.

The processor 224a may determine whether a touch input occurs based on touch data including the touch values applied from the sensing circuit 222a, and may calculate touch coordinates Txy.

The control logic 223a may control an overall operation of the touch controller 220a, and particularly, may control operation timings of the driving circuit 221a and the sensing circuit 222a. The control logic 223a may control operation timings of the driving circuit 221a and the sensing circuit 222a, in synchronization with the first timing signal Tsync1 received from the display driver circuit 210a (see FIG. 5). The control logic 223a may generate a touch sensing timing signal in synchronization with the first timing signal Tsync1 based on a clock signal CLKt applied from the oscillator 225a. For example, the control logic 223a may generate a touch sensing timing signal by dividing the clock signal CLKt, and also, the control logic 223a may count a touch sensing delay time based on the clock signal CLKt. The control logic 223a may output the first timing signal Tsync1 as the second timing signal Tsync2.

When the first timing signal Tsync1 is not received, the control logic 223a may generate a touch sensing timing signal based on the clock signal CLKt, and may output the touch sensing timing signal as the second timing signal Tsync2.

Figure 11:
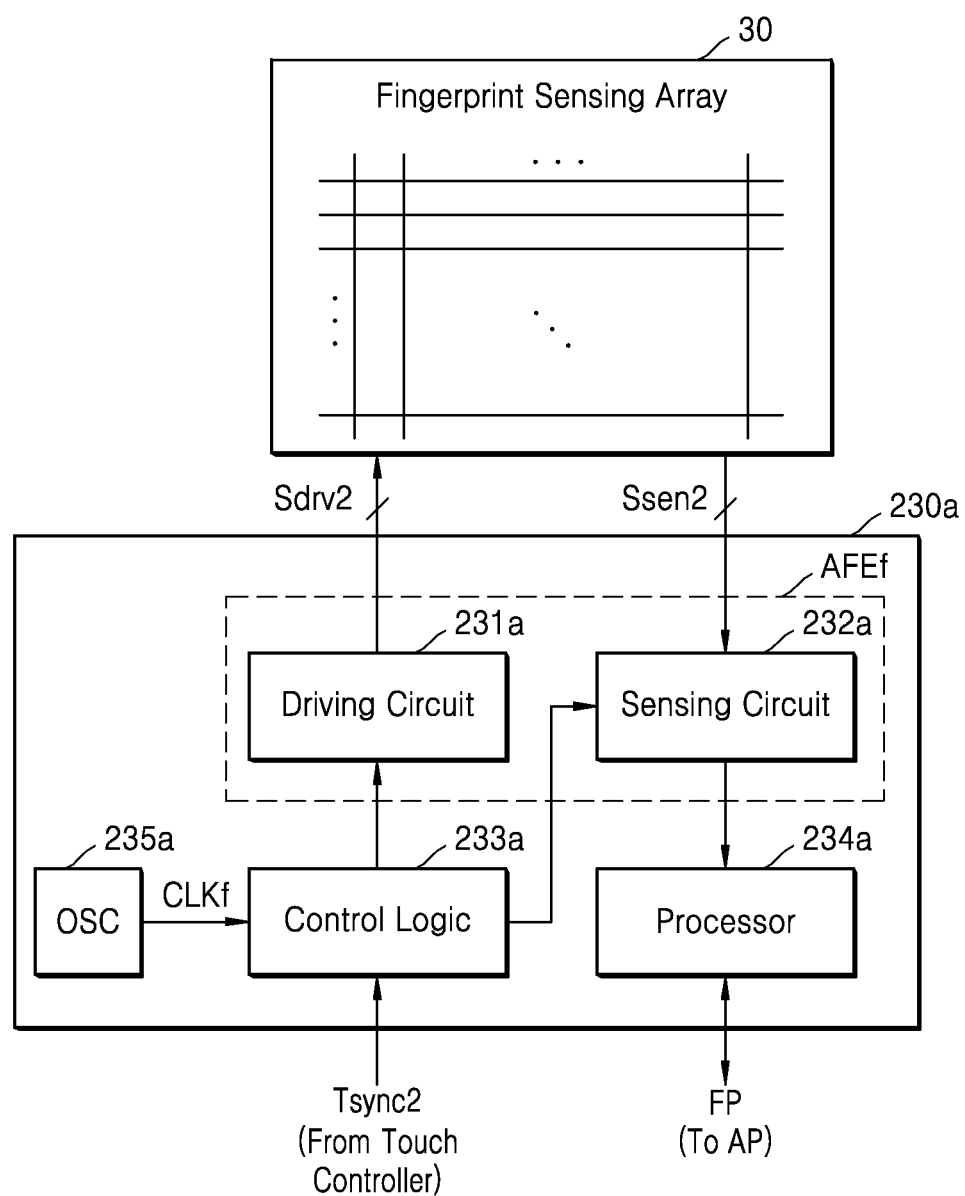
FIG. 11 is a block diagram of a fingerprint controller according to an exemplary embodiment.

FIG. 11 is a block diagram of the fingerprint controller 230a according to an exemplary embodiment.

Referring to FIG. 11, the fingerprint controller 230a may include a driving circuit 231a, a sensing circuit 232a, a control logic 233a, a processor 234a, and an oscillator 235a. The touch controller 220a may further include an interface circuit (not shown) for communicating with an external apparatus or module, and a voltage generating circuit (not shown).

The driving circuit 231a may drive the fingerprint sensing array 20 by providing the fingerprint driving signals Sdrv2 to electrodes of the fingerprint sensing array 20. The sensing circuit 232a may receive the fingerprint sensing signals Ssen2 provided from the fingerprint sensing array 30, and may convert the fingerprint sensing signals Ssen2 that are analog signals into digital sensing values. The digital sensing values may be applied as sensing data to the processor 234a. The driving circuit 231a and the sensing circuit 232a may constitute an analog front end AFEf of the fingerprint controller 230a.

The processor 234a may generate a fingerprint image based on the sensing data, and may provide the fingerprint image FP to the AP 300 (see FIG. 5).

The control logic 233a may control an overall operation of the fingerprint controller 230a, and particularly, may control operation timings of the driving circuit 231a and the sensing circuit 232a. The control logic 233a may control operation timings of the driving circuit 231a and the sensing circuit 232a, in synchronization with the second timing signal Tsync2 received from the touch controller 220a (see FIG. 5). The control logic 233a may generate a fingerprint sensing timing signal in synchronization with the second timing signal Tsync2 based on a clock signal CLKf applied from the oscillator 235a. For example, the control logic 233a may generate a touch sensing timing signal by dividing the clock signal CLKf, and may count a fingerprint sensing delay time based on the clock signal CLKf.

Figure 12A:
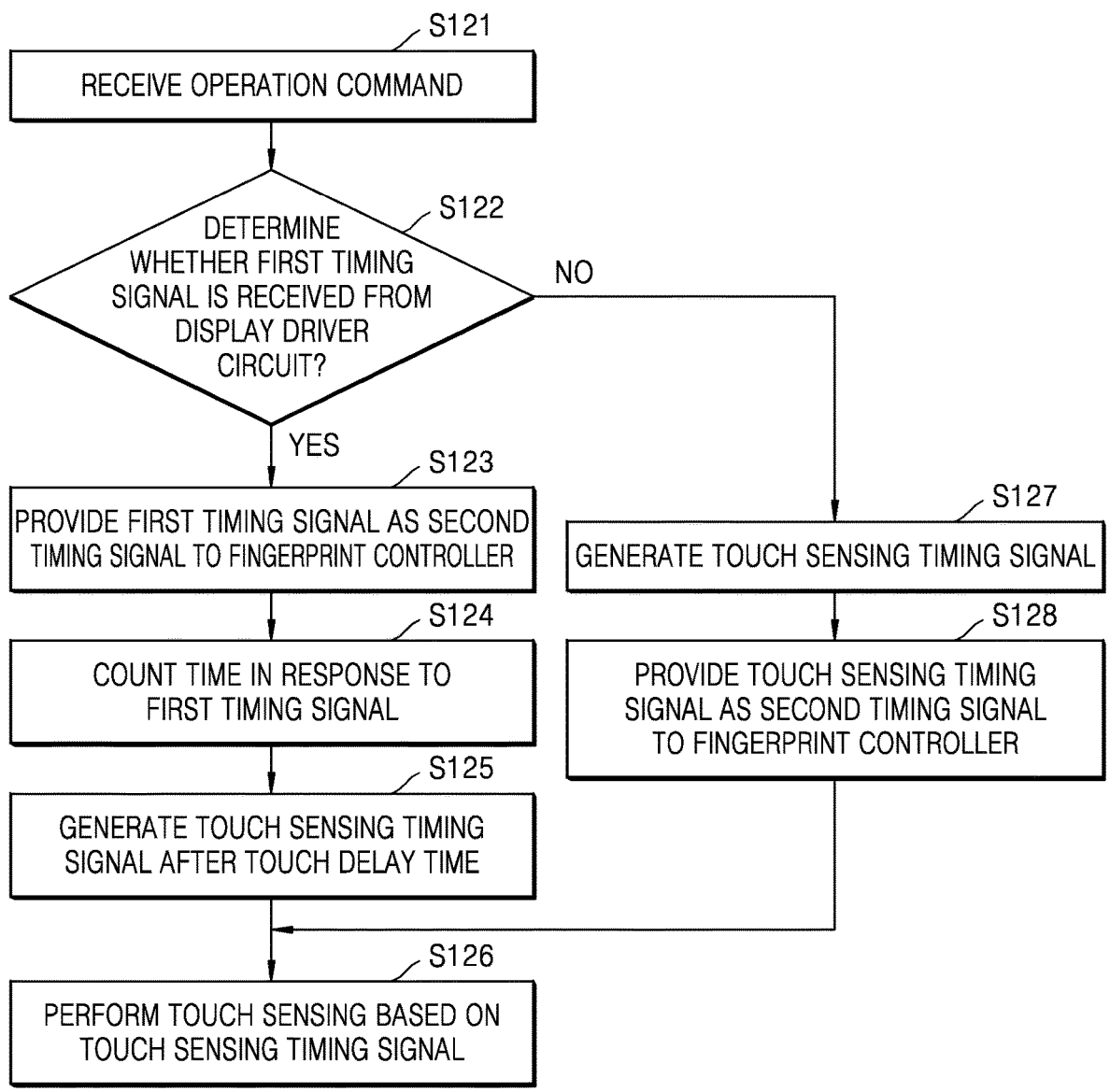
FIG. 12A is a flowchart of a method of operating a touch controller of FIG. 5, according to an exemplary embodiment.
Figure 12B:
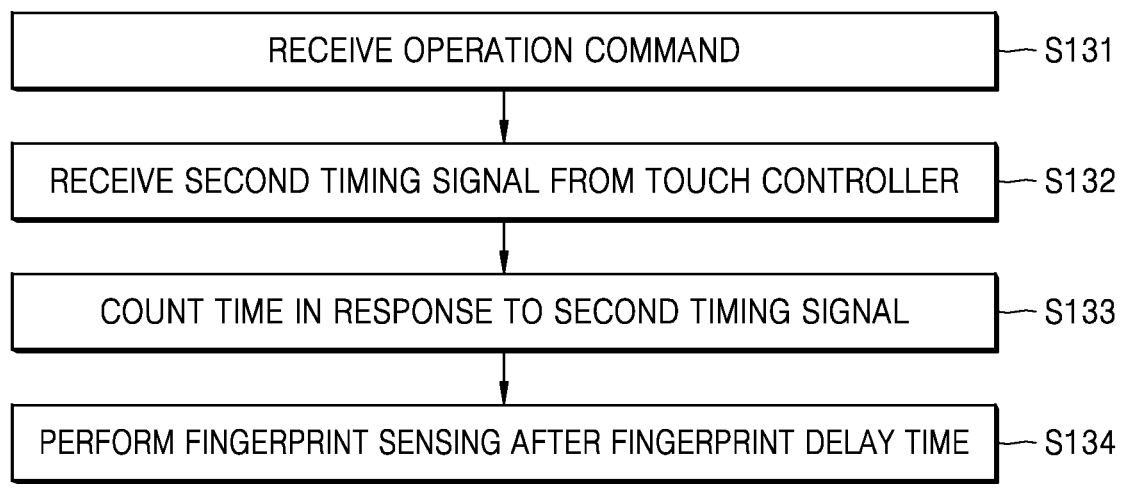
FIG. 12B is a flowchart of a method of operating the touch controller of FIG. 5, according to an exemplary embodiment.

FIG. 12A is a flowchart of a method of operating the touch controller 220a of FIG. 5, according to an exemplary embodiment. FIG. 12B is a flowchart of a method of operating the fingerprint controller 230a of FIG. 5, according to an exemplary embodiment. For convenience of explanation, the following will be described also with reference to FIGS. 10 and 11.

Referring to FIGS. 12A and 10, in operation S121, the touch controller 220a may receive an operation command, for example, a touch sensing command, from the AP 300. In operation S122, the touch controller 220a may determine whether the first timing signal Tsync1 is received from the display driver circuit 210a. When it is determined in operation S122 that the first timing signal Tsync1 is received, the method proceeds to operation S123. In operation S123, the touch controller 220a may provide the first timing signal Tsync1 as the second timing signal Tsync2 to the fingerprint controller 230a. In other words, the touch controller 220a may output the first timing signal Tsync1 as the second timing signal Tsync2.

Next, in operation S124, the touch controller 220a may count a time in response to the first timing signal Tsync1. For example, the control logic 223a may count a time by counting the clock signal CLKt output from the oscillator 225a, in response to a pulse (or a rising edge or falling edge of the pulse) of the first timing signal Tsync1.

In operation S125, the touch controller 220a may generate a touch sensing timing signal, after a touch delay time, in other words, after a touch sensing delay time. In operation S126, the touch controller 220a may perform touch sensing based on the touch sensing timing signal. For example, the control logic 223a may generate the touch sensing timing signal, after the touch delay time, and may control operation timings of the driving circuit 221a and the sensing circuit 222a, based on the touch sensing timing signal.

When it is determined in operation S122 that the first timing signal Tsync1 is not received, the method proceeds to operation S127. In operation S127, the touch controller 220a may generate a touch sensing timing signal. In operation S128, the touch controller 220a may provide the touch sensing timing signal as the second timing signal Tsync2 to the fingerprint controller 230a.

Referring to FIGS. 12B and 11, in operation S131, the fingerprint controller 230a may receive an operation command, for example, a fingerprint sensing command, from the AP 300.

In operation S132, the fingerprint controller 230a may receive the second timing signal Tsync2 from the touch controller 220a. The second timing signal Tsync2 may be the first timing signal Tsync1 that is output from the display driver circuit 210a or a touch sensing timing signal that is generated in the touch controller 220a.

In operation S133, the fingerprint controller 230a may count a time, in response to the second timing signal Tsync2. For example, the control logic 233a may count a time, by counting the clock signal CLKf output from the oscillator 235a, in response to a pulse (or a rising edge or falling edge of the pulse) of the second timing signal Tsync2.

In operation S134, the fingerprint controller 230a may perform fingerprint sensing, after a fingerprint delay time, in other words, after a fingerprint sensing delay time. The fingerprint controller 230a may generate a fingerprint sensing timing signal, and may perform fingerprint sensing based on the fingerprint sensing timing signal. For example, the control logic 233a may generate a fingerprint sensing timing signal, after a fingerprint sensing delay time, and may control operation timings of the driving circuit 231a and the sensing circuit 232a, based on the fingerprint sensing timing signal.

Figure 13:
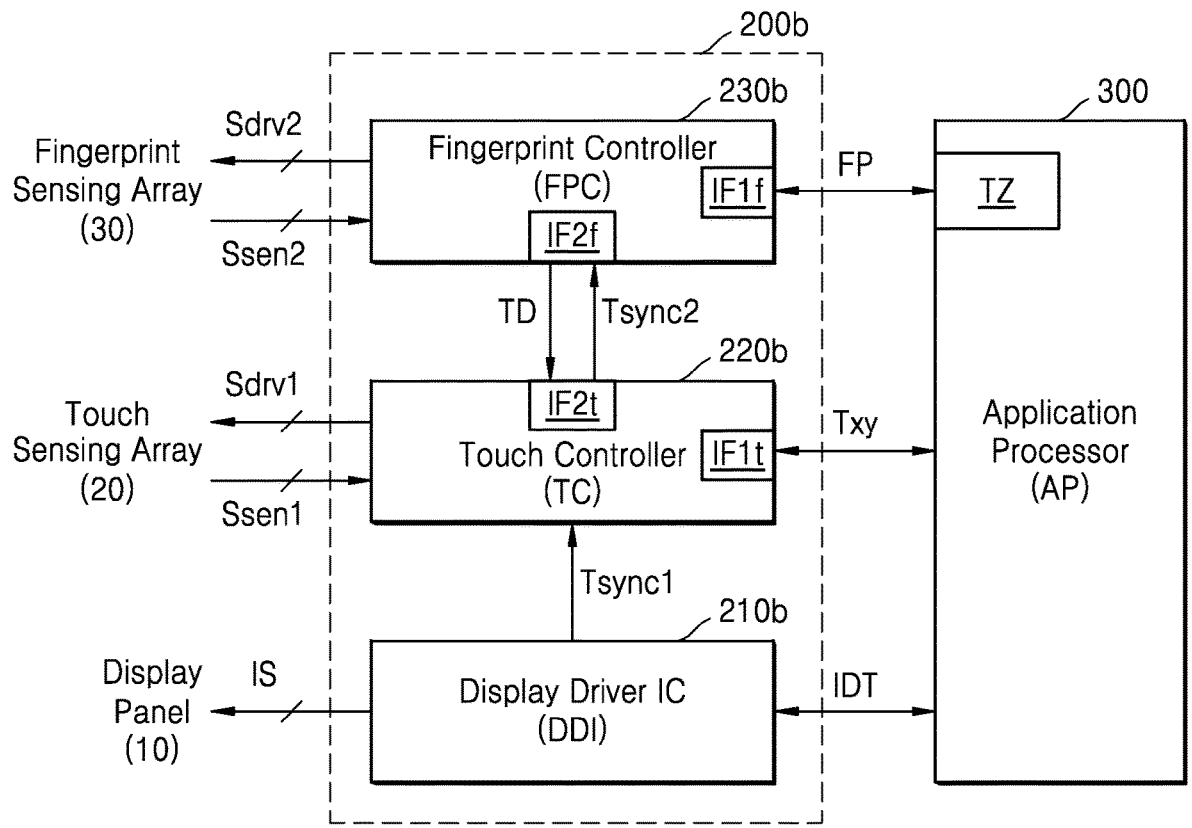
FIG. 13 is a block diagram of a driver integrated circuit according to an exemplary embodiment.

FIG. 13 is a block diagram of a driver integrated circuit 200b according to an exemplary embodiment. For convenience of explanation, the AP 300 is also illustrated. An operation of the driver integrated circuit 200b of FIG. 13B may be similar to an operation of the driver integrated circuit 200a of FIG. 5. The description of the driver integrated circuit 200a of FIG. 5 may apply to the driver integrated circuit 200b of FIG. 13, and thus a repeated explanation will not be given.

In the driver integrated circuit 200b of FIG. 13, a fingerprint controller 230b may receive a touch sensing command from the AP 300 or a touch controller 220b, and may perform touch sensing on the fingerprint sensing region 102 (see FIG. 1). The fingerprint controller 230b may provide touch data TD according to the touch sensing to the touch controller 220b.

The fingerprint controller 230b may include an interface circuit for communication with the touch controller 220b. For example, the fingerprint controller 230b may include a first interface circuit IF1f for communication with the AP 300 and a second interface circuit IF2f for communication with the touch controller 220b, in addition to the elements of FIG. 11. The touch controller 220b may include a first interface circuit IF1t for communication with the AP 300 and a second interface circuit IF2t for communication with the fingerprint controller 230b, in addition to elements of FIG. 10. The second interface circuit IF2f of the fingerprint controller 230b and the second interface circuit IF2t of the touch controller 220b may communicate according to a set interface. The interface may be any of various interfaces described with reference to FIG. 1.

The touch controller 220b may calculate touch coordinates Txy based on touch data (hereinafter, first touch data TD) generated according to touch sensing and touch data (hereinafter, second touch data TD) received from the fingerprint controller 230b.

When the fingerprint sensing array 30 is stacked above the touch sensing array 20 as described with reference to FIG. 2A, or when the fingerprint sensing array 30 and the touch sensing array 20 are formed in the same layer as described with reference to FIG. 2B, the touch controller 220b may calculate the touch coordinates Txy more accurately based on not only the first touch data according to touch sensing but also the second touch data TD received from the fingerprint controller 230a.

Figure 14:
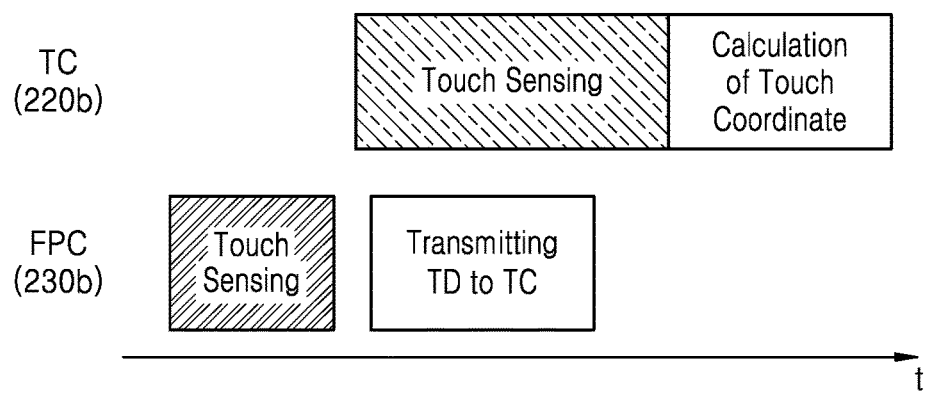
FIG. 14 is a timing diagram for explaining operations of a touch controller and a fingerprint controller of FIG. 13, according to an exemplary embodiment.

FIG. 14 is a timing diagram for explaining operations of the touch controller 220b and the fingerprint controller 230b of FIG. 13.

Referring to FIG. 14, the fingerprint controller 230b may perform touch sensing, and then the touch controller 220b may perform touch sensing. When the touch controller 220b performs touch sensing, the fingerprint controller 230b may transmit the second touch data TD generated according to the touch sensing to the touch controller 220b. The touch controller 220b may calculate touch coordinates based on the first touch data and the second touch data TD, after the touch sensing.

Touch sensing of the fingerprint controller 230b of FIG. 14 may be performed prior to touch sensing of the touch controller 220b, in synchronization with the first timing signal Tsync1, like fingerprint sensing of the fingerprint controller 230b of FIGS. 7A and 8B. Also, when a display driver circuit 210b does not operate, touch sensing of the fingerprint controller 230b may be performed prior to touch sensing of the touch controller 220b, in synchronization with the second timing signal Tsync2, like fingerprint sensing of the fingerprint controller 230b of FIG. 8A.

Figure 15:
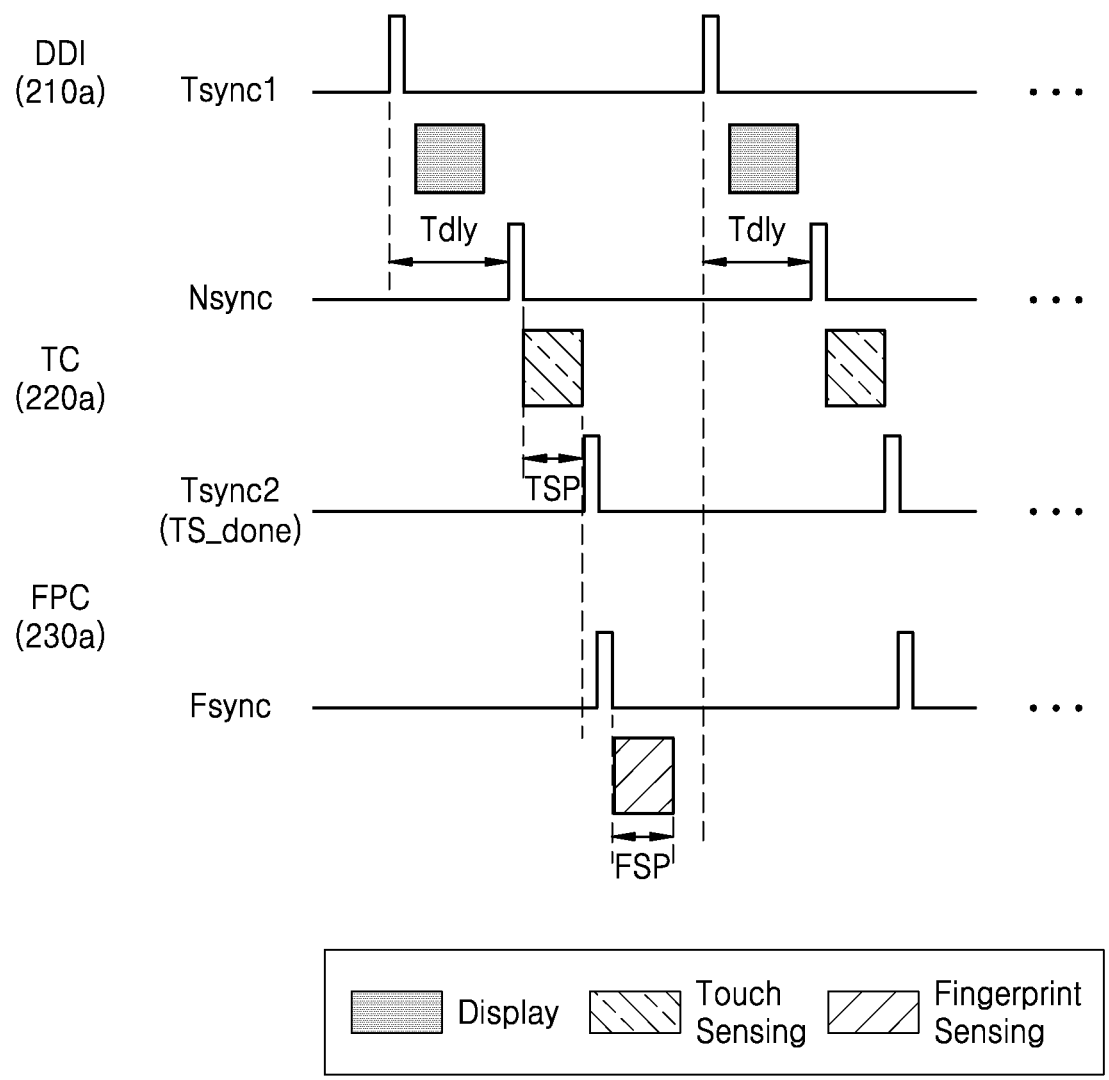
FIG. 15 is a timing diagram for explaining a method of operating the display driver circuit of FIG. 5, according to an exemplary embodiment.

FIG. 15 is a timing diagram for explaining a method of operating the display driver circuit 210a of FIG. 5 according to an exemplary embodiment.

Referring to FIG. 15, the display driver circuit 210a may perform displaying in response to the first timing signal Tsync1, and the touch controller 220a may perform touch sensing, after the touch sensing delay time Td that is preset, based on the first timing signal Tsync1. The touch controller 220a may generate a touch sensing timing signal Nsync, after the touch sensing delay time Td from a time when a pulse (e.g., a rising edge or falling edge of the pulse) of each first timing signal Tsync1 is generated, and may perform touch sensing in a touch sensing interval TSP based on the touch sensing timing signal Nsync.

When the touch sensing ends, the touch controller 220a may generate a touch sensing end signal TS_done, and may output the touch sensing end signal TS_done as the second timing signal Tsync2. The fingerprint controller 230a may perform fingerprint sensing, in response to the second timing signal Tsync2, that is, the touch sensing end signal TS_done. For example, the fingerprint controller 230a may generate a fingerprint sensing timing signal Fsync, in response to a pulse (e.g., a rising edge or falling edge of the pulse) of the touch sensing end signal TS_done, and may perform fingerprint sensing based on the fingerprint sensing timing signal Fsync. Accordingly, fingerprint sensing may be performed after touch sensing is performed.

Figure 16:
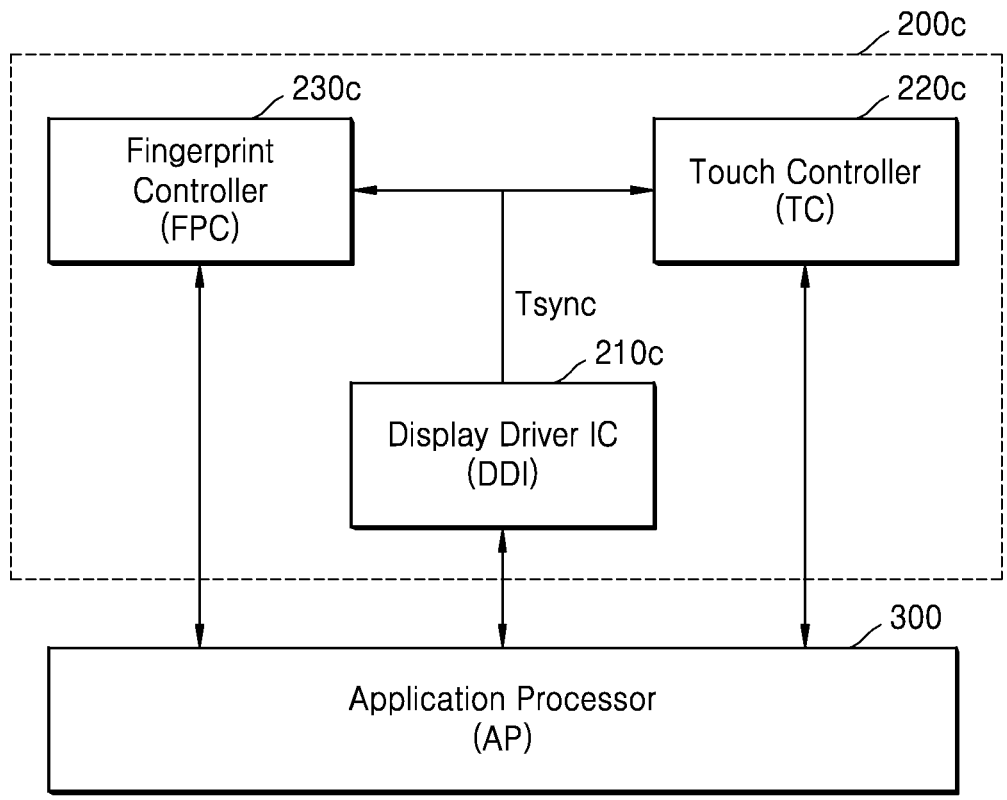
FIG. 16 is a block diagram of a driver integrated circuit according to an exemplary embodiment.
Figure 17:
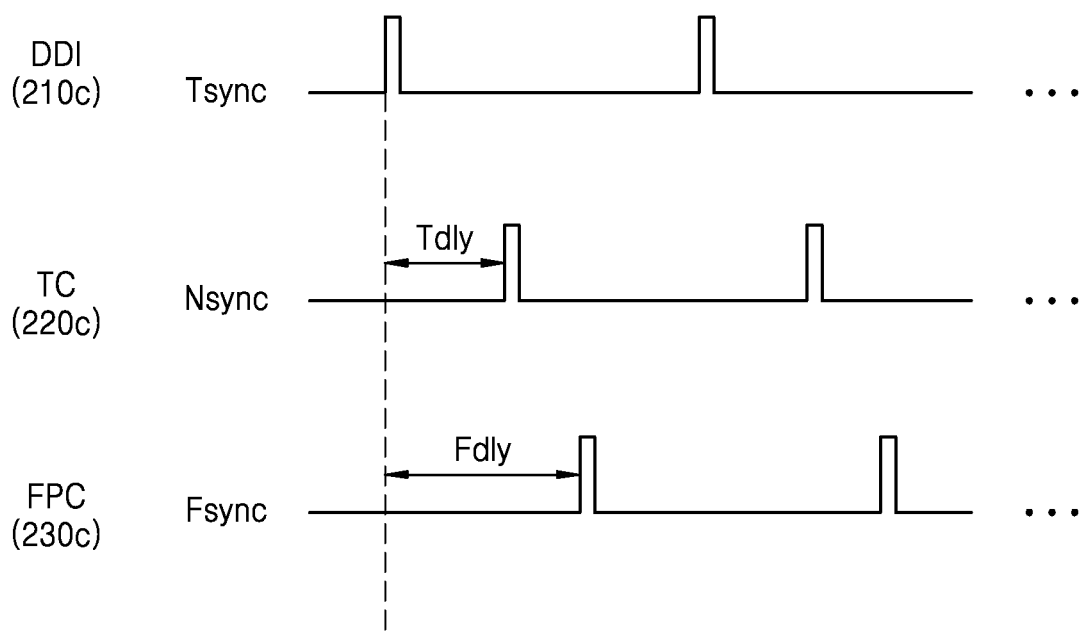
FIG. 17 is a timing diagram of a method of operating the driver integrated circuit of FIG. 16, according to an exemplary embodiment.

FIG. 16 is a block diagram of a driver integrated circuit 200c according to an exemplary embodiment. FIG. 17 is a timing diagram for explaining a method of operating the driver integrated circuit 200c of FIG. 16.

Referring to FIG. 16, a touch controller 220c and a fingerprint controller 230c may receive a timing signal Tsync, for example, a first timing signal, output from the display driver circuit 210c, and may operate in synchronization with the timing signal Tsync.

Referring to FIG. 17, the touch controller 220c may generate the touch sensing timing signal Nsync, after a touch sensing delay time Td1y that is preset based on the timing signal Tsync, and may perform touch sensing based on the touch sensing timing signal Nsync. The fingerprint controller 230c may generate the fingerprint sensing timing signal Fsync, after a fingerprint sensing delay time Fd1y that is preset based on the timing signal Tsync, and may perform fingerprint sensing based on the fingerprint sensing timing signal Fsync. The fingerprint sensing delay time Fd1y may be greater than the touch sensing delay time Td1y. The fingerprint sensing delay time Fd1y may be set considering a displaying interval and a touch sensing interval. Accordingly, displaying, touch sensing, and fingerprint sensing may be sequentially performed in one cycle of the timing signal Tsync.

Figure 18:
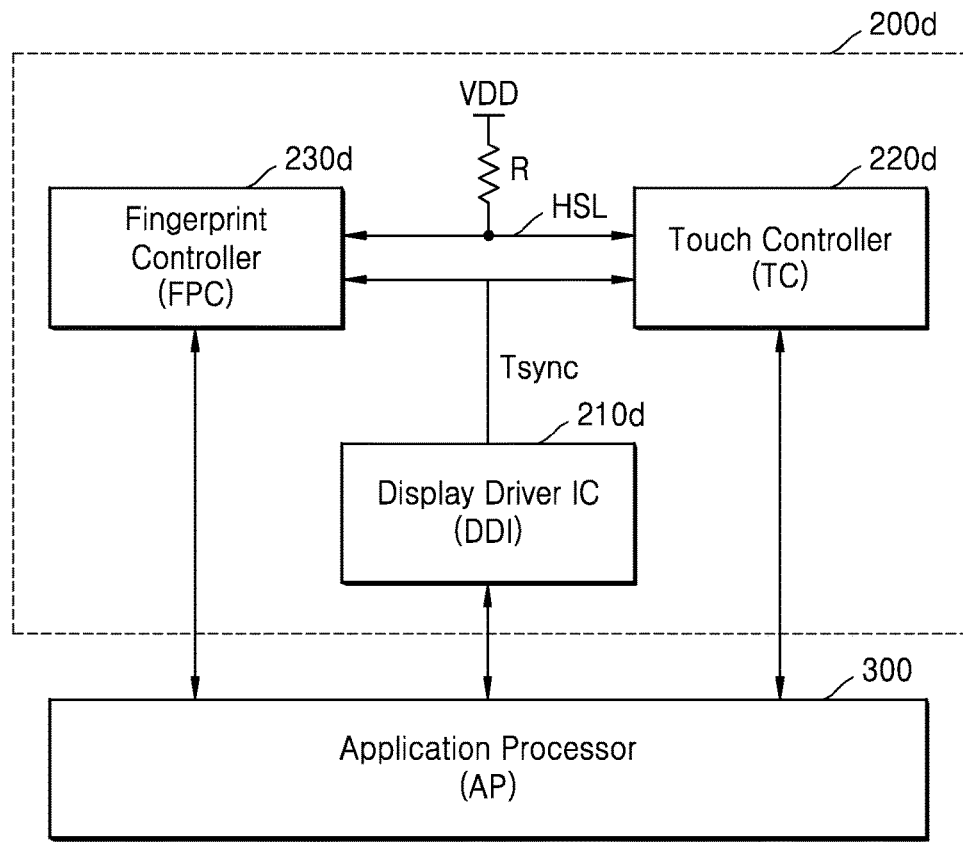
FIG. 18 is a block diagram of a driver integrated circuit according to an exemplary embodiment.
Figure 19:
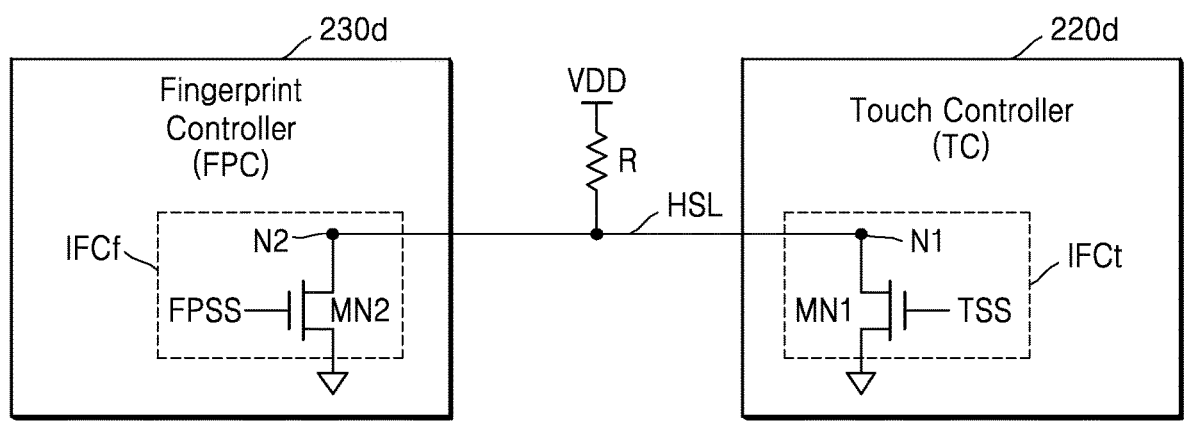
FIG. 19 is a detailed view for explaining a touch controller and a fingerprint controller of FIG. 18, according to an exemplary embodiment.

FIG. 18 is a block diagram of a driver integrated circuit 200d according to an exemplary embodiment. FIG. 19 is a detailed view for explaining a touch controller 220d and a fingerprint controller 230d of FIG. 18.

Referring to FIG. 18, the touch controller 220d and the fingerprint controller 230d may receive the timing signal Tsync, for example, a first timing signal, output from a display driver circuit 210d, and may each operate in synchronization with the timing signal Tsync. The touch controller 220d and the fingerprint controller 230d may share a state line HSL, may check an operation state of each other based on a level of the state line HSL, and may determine whether to perform touch sensing and fingerprint sensing based on a result of the checking.

As shown in FIG. 19, an interface circuit IFCt of the touch controller 220d and an interface circuit IFCf of the fingerprint controller 230d may be implemented by using an open drain method. The interface circuit IFCt of the touch controller 220d may include a transistor MN1, and a drain of the transistor MN1 may be connected to the state line HSL. The state line HSL may be connected to a power supply voltage VDD through a resistor R. When the touch controller 220d performs touch sensing, a touch sensing signal TSS, for example, the power supply voltage VDD, may be applied to a gate of the transistor MN1, and thus the transistor MN1 may be turned on. The interface IFCf of the fingerprint controller 230d may include a transistor MN2, and a drain of the transistor MN2 may be connected to the state line HSL. When the fingerprint controller 230d performs fingerprint sensing, a fingerprint sensing signal FPSS, for example, the power supply voltage VDD, may be applied to a gate of the transistor MN2, and the transistor MN2 may be turned on.

When the transistor MN1 and the transistor MN2 are turned off, a voltage level of the state line HSL may be the same as a voltage level of the power supply voltage VDD. Next, when the transistor MN1 or the transistor MN2 is turned on, the voltage level of the state line HSL may be reduced. For example, a voltage level of the state line HSL may be changed to a ground voltage level.

The touch controller 220d and the fingerprint controller 230d may check an operation state of each other by detecting the voltage level of the state line HSL through a hand shaking method using the state line HSL. For example, the touch controller 220d may detect a voltage level of a node N1 connected to the state line HSL, and the fingerprint controller 230d may detect a voltage level of a node N2 connected to the state line HSL. When it is determined that the fingerprint controller 230d is not in a fingerprint sensing state, the touch controller 220d may perform touch sensing. When it is determined that the touch controller 220d is not in a touch sensing state, the fingerprint controller 230d may perform fingerprint sensing.

Figure 20:
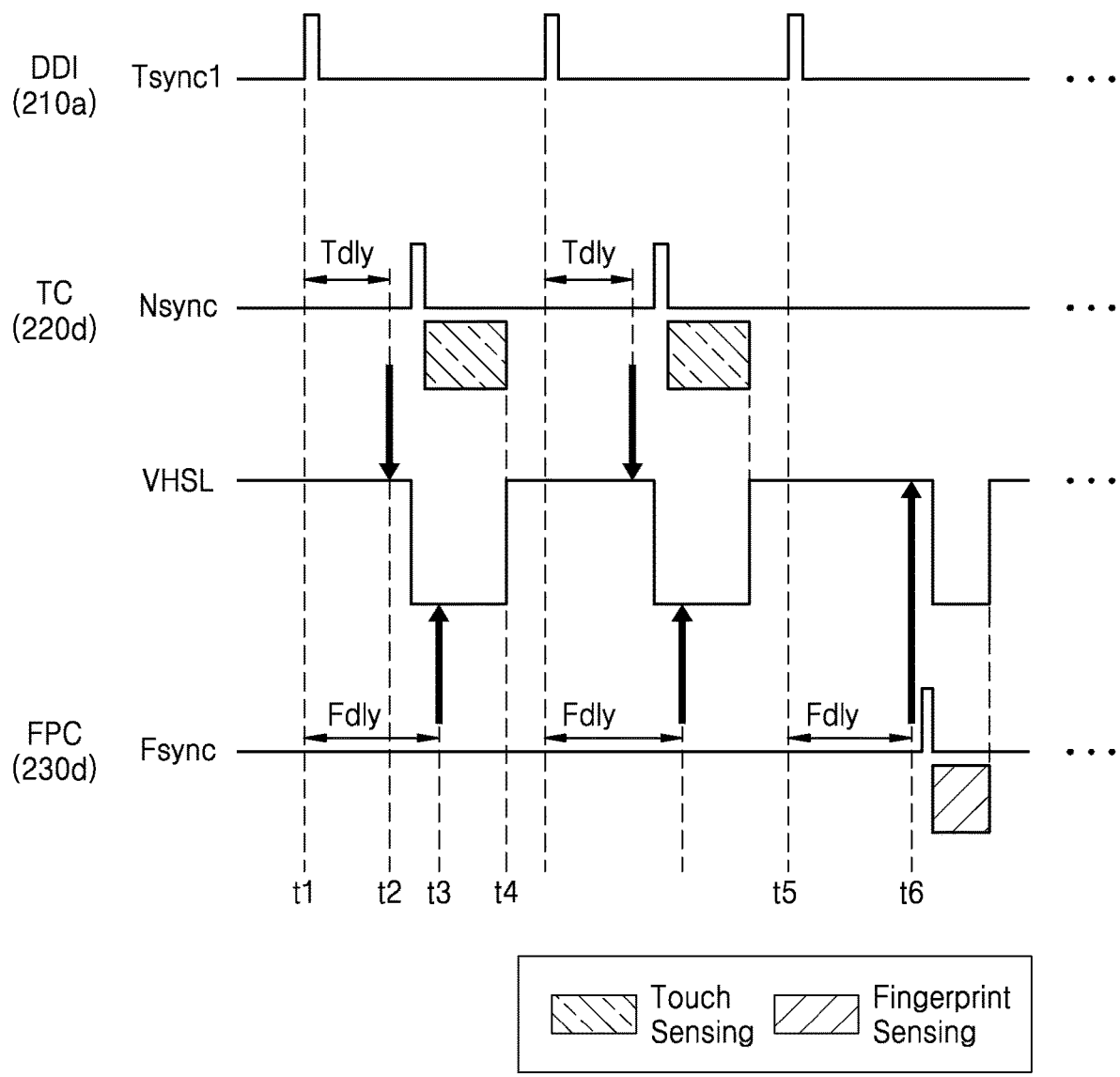
FIG. 20 is a timing diagram for explaining a method of operating a driver integrated circuit of FIG. 19, according to an exemplary embodiment.

FIG. 20 is a timing diagram for explaining a method of operating the driver integrated circuit 200d of FIG. 19 according to an exemplary embodiment.

Referring to FIG. 20, the touch controller 220d may check a voltage level VSHL (hereinafter, a state line voltage level) of the state line HSL, after the touch sensing delay time Td1y that is preset, based on the timing signal Tsync. For example, the touch controller 220d may check the state line voltage level VHSL at a time t2, after the touch sensing delay time Td1y from a time t1 when a pulse of the timing signal Tsync is generated. When the state line voltage level VHSL is a first level, for example, a power supply voltage level, it may be determined that the fingerprint controller 230d is not in a fingerprint sensing state and the touch controller 220d may perform touch sensing. The fingerprint controller 230d may generate the touch sensing timing signal Nsync, and may perform touch sensing based on the touch sensing timing signal Nsync. The touch controller 220d may change the state line voltage level VHSL to a second level, for example, a ground voltage level, before touch sensing is performed, and may change the state line voltage level VHSL at a time t4, to the first level, after the touch sensing ends.

The fingerprint controller 230d may check the state line voltage level VHSL, after the fingerprint sensing delay time Fd1y that is preset, based on the timing signal Tsync. For example, the fingerprint controller 230d may check the state line voltage level VHSL at a time t3. Since the state line voltage level VHSL is the second level, it is determined that the touch controller 220d is in a touch sensing state and the fingerprint controller 230d does not perform fingerprint sensing.

Like at a time t6, when the state line voltage level VHSL is the first level, after the fingerprint sensing delay time Td1y from a time (e.g., a time t5) when a pulse of the timing signal Tsync is generated, it may be determined that the touch controller 220d is not in a touch sensing state and fingerprint sensing may be performed. The fingerprint controller 230d may generate the fingerprint sensing timing signal Fsync and may perform fingerprint sensing based on the fingerprint sensing timing signal Fsync. The fingerprint controller 230d may change the state line voltage level VHSL to the second level, before fingerprint sensing is performed, and may change the state voltage level VHSL to the first level, after the fingerprint sensing ends.

Although touch sensing is performed first in FIG. 20, the inventive concept is not limited thereto, and an order of performing touch sensing and fingerprint sensing may be determined according to a touch sensing delay time and a fingerprint sensing delay time. For example, when the fingerprint sensing delay time is shorter than the touch sensing delay time, fingerprint sensing may be performed prior to touch sensing.

A method of operating the driver integrated circuit 200d of FIG. 19 has been described with reference to FIG. 20. However, the inventive concept is not limited thereto, and the method of operating the driver integrated circuit 200d of FIG. 19 may be modified in various ways as long as the touch controller 220d and the fingerprint controller 230d check an operation state of each other by using a hand shaking method and determine whether to perform touch sensing and fingerprint sensing based on the checked operation state.

Figure 21:
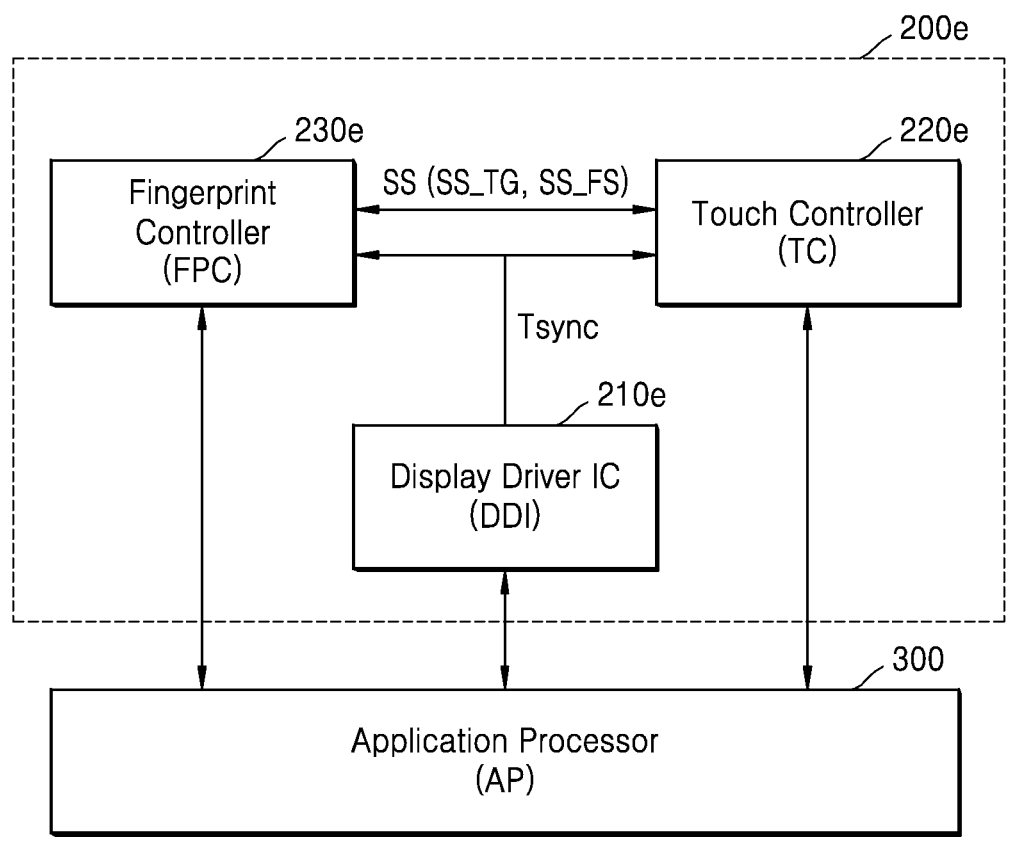
FIG. 21 is a block diagram of a driver integrated circuit according to an exemplary embodiment.
Figure 22:
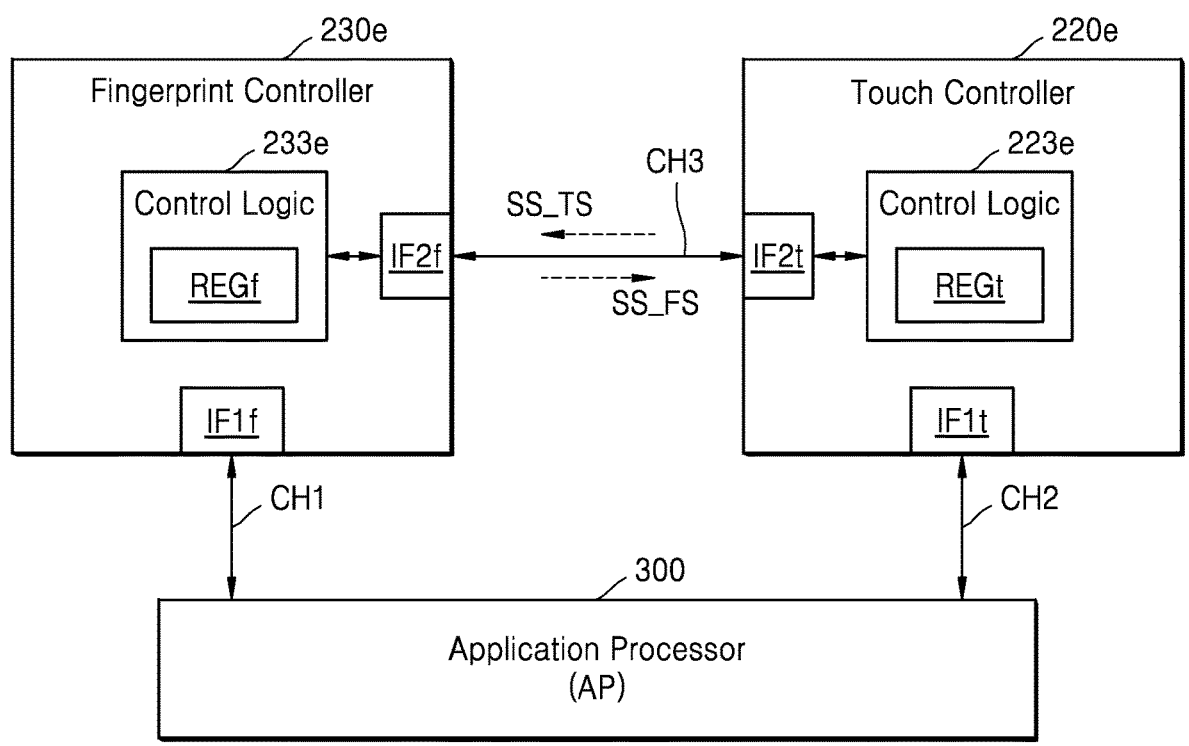
FIG. 22 is a detailed view for explaining a touch controller and a fingerprint controller of FIG. 21, according to an exemplary embodiment.

FIG. 21 is a block diagram of a driver integrated circuit 200e according to an exemplary embodiment. FIG. 22 is a detailed view for explaining a touch controller 220e and a fingerprint controller 230e of FIG. 21.

Referring to FIG. 21, the touch controller 220e and the fingerprint controller 230e may receive the timing signal Tsync, for example, a first timing signal, output from a display driver circuit 210e, and may each operate in synchronization with the timing signal Tsync. The touch controller 220e and the fingerprint controller 230e may transmit/receive a state signal SS (or referred to as state information). The state signal SS may include a touch sensing state signal SS_TG and a fingerprint sensing state signal SS_FS.

For example, as shown in FIG. 22, the touch controller 220e and the fingerprint controller 230e may include second interface circuits IF2f and IF2t for communication with each other, in addition to first interface circuits IF1f and IF1t for communication with the AP 300, and the second interface circuits IF2f and IF2t may communicate with each other through a third channel CH3 separate from channels (e.g., a first channel CH1 and a second channel CH2) for communication with the AP 300. The touch controller 220e and the fingerprint controller 230e may set a lock flag bit in each of registers REGt and REGf to a first value (e.g., a high level) when touch sensing and fingerprint sensing are performed, respectively, and may set the lock flag bit to a second value (e.g., a low level) when the touch sensing and the fingerprint sensing end, respectively.

The touch controller 220e may request the fingerprint controller 230e for a fingerprint sensing state before touch sensing is performed, and the fingerprint controller 230e may transmit a lock flag bit value of the register REFf as a fingerprint sensing state signal FF_FS to the touch controller 220e, in response to the fingerprint sensing state request. When it is determined based on the fingerprint sensing state signal FF_FS that the fingerprint controller 230e is not in a fingerprint sensing state, the touch controller 220e may perform touch sensing.

The fingerprint controller 230e may request the touch controller 220e for a touch sensing state before fingerprint sensing is performed, and the touch controller 220e may transmit a lock flag bit value of the register REFt as the touch sensing state signal FF_TS to the fingerprint controller 230e, in response to the touch sensing state request. When it is determined based on the touch sensing state signal FF_TS that the touch controller 220e is not in a touch sensing state, the fingerprint controller 230e may perform fingerprint sensing.

Figure 23:
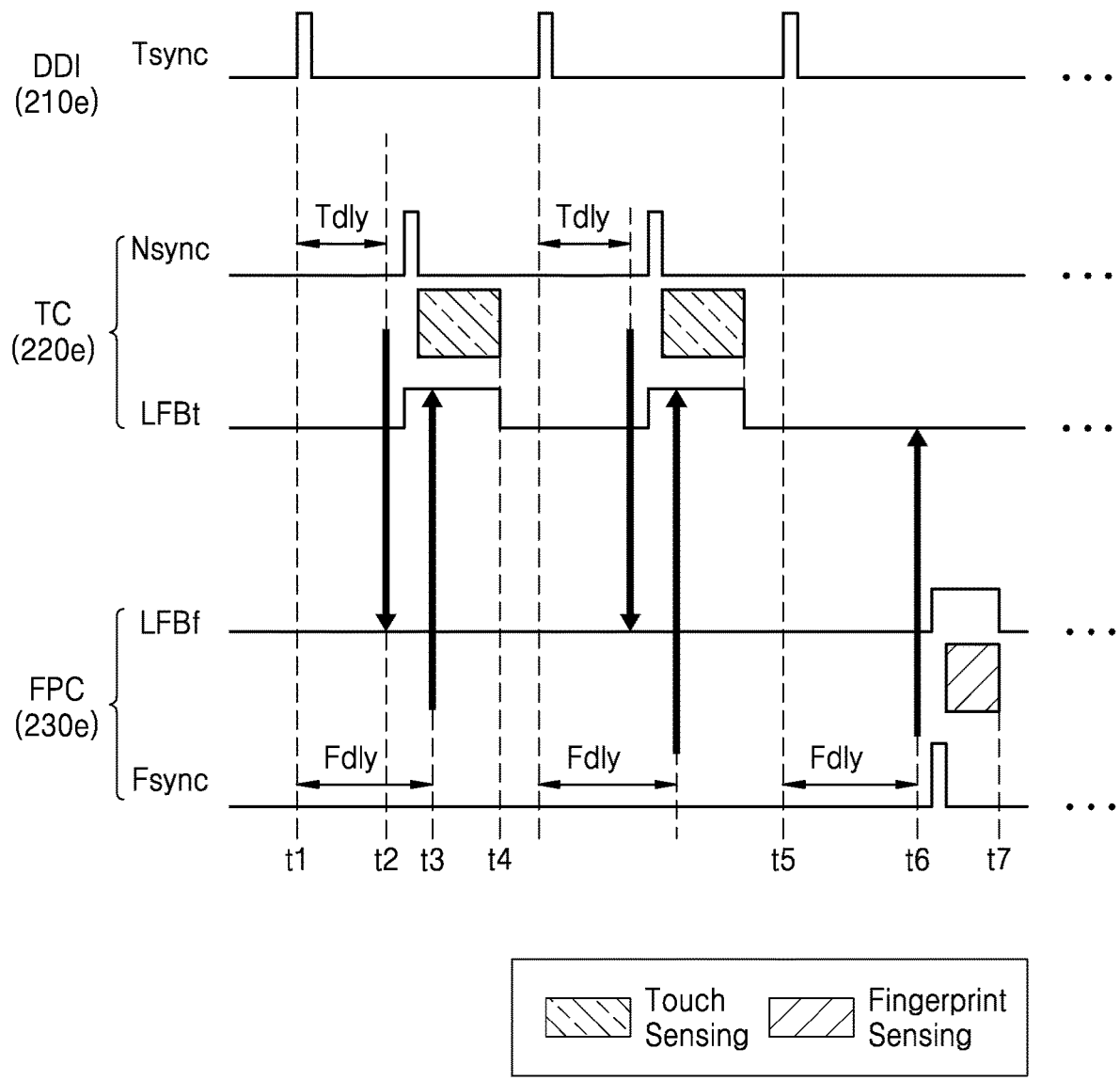
FIG. 23 is a timing diagram for explaining a method of operating the driver integrated circuit of FIG. 21, according to an exemplary embodiment.

FIG. 23 is a timing diagram for explaining a method of operating the driver integrated circuit 200e of FIG. 21 according to an exemplary embodiment.

Referring to FIG. 23, the touch controller 220e may check an operation state of the fingerprint controller 230e, after the touch sensing delay time Td1y that is preset, based on the timing signal Tsync. For example, the touch controller 220e may check a lock flag bit LFBf of the fingerprint controller 230e at a time t2, after the touch sensing delay time Td1y from a time t1 when a pulse of the timing signal Tsync is generated. Since the lock flag bit LFBf is a low level, the touch controller 220e may generate the touch sensing timing signal Nsync, and may perform touch sensing based on the touch sensing timing signal Nsync. As described above, the touch controller 220e may change a lock flag bit LFBt to a high level when touch sensing is performed, and may change the lock flag bit LFBt to a low level after the touch sensing ends.

The fingerprint controller 230e may check an operation state of the touch controller 220e, after the fingerprint sensing delay time Fd1y that is preset, based on the timing signal Tsync. For example, the fingerprint controller 230e may check the lock flag bit LFBt of the touch controller 220e at a time t3, after the fingerprint sensing delay time Td1y from the time t1 when the pulse of the timing signal Tsync is generated. Since the lock flag bit LFBt is a high level, it is determined that the touch controller 220e is in a touch sensing state and the fingerprint controller 230e does not perform fingerprint sensing. Like at a time t6, when the lock flag bit LFBt is a low level, it may be determined that the touch controller 220e is not in a touch sensing state and the fingerprint controller 230e may perform fingerprint sensing. The fingerprint controller 230e may generate the fingerprint sensing timing signal Fsync, and may perform fingerprint sensing based on the fingerprint sensing timing signal Fsync. An order of performing touch sensing and fingerprint sensing may be determined by adjusting the touch sensing delay time Td1y and the fingerprint sensing delay time Fd1y.

A method of operating the driver integrated circuit 200e of FIG. 21 has been described with reference to FIG. 23. However, the inventive concept is not limited thereto, and the method of operating the driver integrated circuit 200e of FIG. 21 may be modified in various ways as long as the touch controller 220e and the fingerprint controller 230e check an operation state of each other through a set interface and determine whether to perform touch sensing and fingerprint sensing based on the checked operation state.

As described with reference to FIGS. 18 through 23, the touch controllers 220d and 220e and the fingerprint controllers 230d and 230e of the driver integrated circuits 200d and 200e according to an exemplary embodiment may operate in synchronization with the timing signal Tsync applied from the display driver circuits 210d and 210e, may check an operation state of each other, and may perform a corresponding sensing operation when another sensing operation is not performed.

Figure 24:
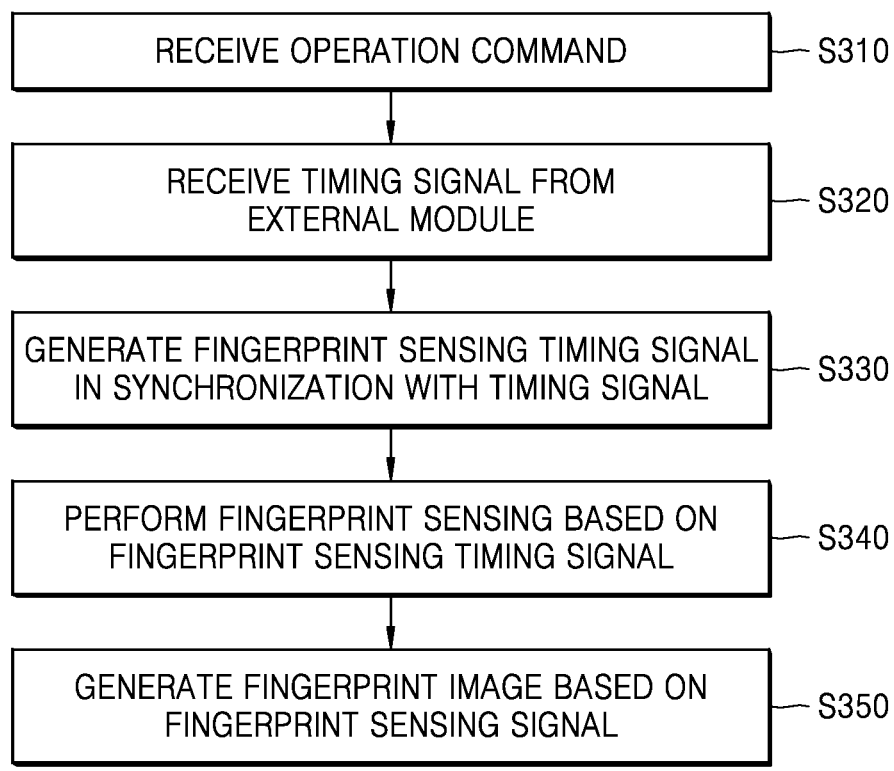
FIG. 24 is a flowchart of a method of operating a fingerprint controller, according to an exemplary embodiment.

FIG. 24 is a flowchart of a method of operating a fingerprint controller according to an exemplary embodiment. The method of FIG. 24 may apply to a fingerprint controller of a driver integrated circuit according to any of above various embodiments.

Referring to FIG. 24, in operation S310, a fingerprint controller may receive an operation command. The fingerprint controller may receive a fingerprint sensing command from a host process, for example, an AP, and may receive a touch sensing command from the host processor or a touch controller.

In operation S320, the fingerprint controller may receive a timing signal from an external module. For example, the fingerprint controller may receive the timing signal from a display driver circuit or the touch controller. The fingerprint controller may receive a display timing signal from the display driver circuit. In an exemplary embodiment, the fingerprint controller may receive a display timing signal or a touch sensing timing signal from the touch controller. In another embodiment, the fingerprint controller may receive a touch sensing end signal from the touch controller.

In operation S330, the fingerprint controller may generate a fingerprint sensing timing signal in synchronization with the timing signal. The fingerprint controller may generate the fingerprint sensing timing signal after a fingerprint sensing delay time, based on the timing signal. When the timing signal is a touch sensing end signal, the fingerprint controller may generate the fingerprint sensing timing signal in response to the timing signal.

In operation S340, the fingerprint controller may perform fingerprint sensing based on the fingerprint sensing timing signal. In operation S350, the fingerprint controller may generate a fingerprint image based on a fingerprint sensing signal received according to the fingerprint sensing. In an exemplary embodiment, the fingerprint controller may perform touch sensing on a fingerprint sensing region, based on the touch sensing timing signal, and may generate touch data based on a fingerprint sensing signal generated according to the touch sensing. The fingerprint controller may provide the touch data to the touch controller.

Figure 25:
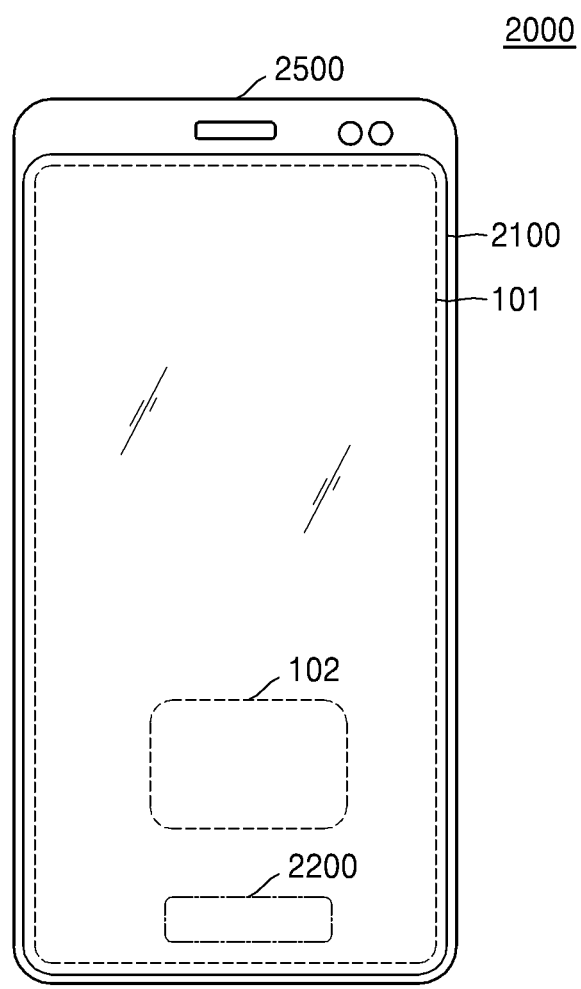
FIG. 25 is a view of a mobile terminal according to an exemplary embodiment.

FIG. 25 is a view of a mobile terminal 2000 according to an exemplary embodiment.

Referring to FIG. 25, the mobile terminal 2000 may include a touchscreen panel 2100, a driver integrated circuit 2200, and a housing 2500. The mobile terminal 2000 may include an AP for controlling an overall operation of the mobile terminal 2000.

The housing 2500 may form an outer appearance of the mobile terminal 2000, and may protect elements, for example, integrated circuits, a battery, and an antenna, in the mobile terminal 2000 from an external impact or a scratch. The driver integrated circuit 2200 may be located in the housing 2500.

The touchscreen panel 2100 may operate as an input/output device of the touchscreen apparatus 1000 by performing displaying, touch sensing, and fingerprint sensing. In an exemplary embodiment, the touchscreen panel 2100 may sense a force of a touch input.

Any of the touchscreens 100*a*, 100*b*, and 100*c* of FIGS. 2A through 2C may be applied to the touchscreen panel 2100. A top surface of the touchscreen panel 2100 may include the touch sensing region 101 and the fingerprint sensing region 102. The fingerprint sensing region 102 may overlap a part of the touch sensing region 101.

As described with reference to FIGS. 2A through 2C, in a vertical structure of the touchscreen panel 2100, a fingerprint sensing array may be stacked on a display and/or touch sensing array, and may be referred to as an on-display fingerprint sensing array.

Fingerprint authentication using a user's fingerprint may be used as one of security methods for safely using the mobile terminal 2000. Accordingly, the fingerprint sensing array is provided in the mobile terminal 2000. When the on-display fingerprint sensing array is used, since an additional space for a fingerprint sensing array is not required on a front surface of the mobile terminal 2000, the area of the touchscreen panel 2100 may not be reduced.

The driver integrated circuit 2200 may perform a displaying function, a touch sensing function, and a fingerprint sensing function by driving the touchscreen panel 2100. Any of the driver integrated circuits 200, 200*a*, 200*b*, 200*c*, 200*d*, and 200*e* according to various exemplary embodiments may be applied to the driver integrated circuit 2200.

In the driver integrated circuit 2200 according to an exemplary embodiment, a display driver circuit, a touch controller, and a fingerprint controller operate in synchronization with one another. Since a corresponding driving operation is performed when another driving operation is not performed, performance degradation due to noise according to the other driving operation may be prevented. Also, since the display driver circuit, the touch controller, and the fingerprint controller operate in synchronization with one another without intervention of an AP, a load of the AP may be reduced.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in the drawings such as FIGS. 1, 5, 9-11, 13, 16, 18, 19, 21 and 22 may be embodied as various numbers of hardware, software and/or firmware structures that execute respective functions described above, according to the exemplary embodiments. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. In addition, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

While the inventive concept has been particularly shown and described with reference to exemplary embodiments thereof, it will be understood that various changes in form and details may be made therein without departing from the spirit and scope of the following claims. Accordingly, the true technical scope of the inventive concept is defined by the technical spirit of the appended claims.

What is claimed is:

1. A method of operating a fingerprint controller for driving a fingerprint sensing array included in a touchscreen divided by at least a touch sensing region and a fingerprint sensing region, the method comprising:
   receiving a reference timing signal from one of a touch controller and a display driver circuit;
   generating a fingerprint sensing timing signal in synchronization with the reference timing signal; and
   driving the fingerprint sensing array based on the fingerprint sensing timing signal,
   wherein the touchscreen further comprises a touch sensing array, configured to be driven by the touch controller to perform touch sensing at the touch sensing region to generate touch data comprising touch coordinates on the touch sensing region, and a display panel configured to be driven by the display driver circuit to display an image on the touchscreen, and
   wherein a time point to start the driving the fingerprint sensing array is set to be different from a time point to start the driving the display panel to display the image and a time point to start the driving the touch sensing array to perform the touch sensing,
   wherein the fingerprint controller, the touch controller and the display driver circuit are different from each other,
   wherein a signal path of the fingerprint sensing timing signal is different from a signal path of the reference timing signal, and
   wherein while the touch sensing array is driven to perform the touch sensing or the display panel is driven to display the image, the fingerprint sensing array is not driven to start fingerprint sensing.

2. The method of claim 1, further comprising:
generating touch data, comprising touch coordinates on the fingerprint sensing region, based on touch sensing at the fingerprint sensing region by the fingerprint sensing array; and
transmitting the touch data comprising the touch coordinates on the fingerprint sensing region to the touch controller.

3. The method of claim 1, wherein the reference timing signal is one of a touch sensing timing signal used by the touch controller to drive the touch sensing array to perform the touch sensing, and a display timing signal used by the display driver circuit to drive the display panel.

4. The method of claim 1, wherein the fingerprint sensing timing signal to drive the fingerprint sensing array is generated in synchronization with the reference timing signal, and
wherein the generating the fingerprint sensing timing signal comprises:
counting a time in response to a pulse of the reference timing signal; and
generating the fingerprint sensing timing signal after a preset delay time based on the counting.

5. The method of claim 4, wherein the pulse of the reference timing signal is a vertical synchronization signal of the display panel,
wherein the preset delay time is a first fingerprint sensing delay time plus a second fingerprint sensing delay time, and
wherein the first fingerprint sensing delay time comprises at least one cycle of a horizontal synchronization signal of the display panel, and the second fingerprint sensing delay time is a part of one cycle of the horizontal synchronization signal.

6. The method of claim 4, wherein the pulse of the reference timing signal is a vertical synchronization signal of the display panel,
wherein the preset delay time is a part of one cycle of a horizontal synchronization of the display panel.

7. The method of claim 4, wherein the fingerprint sensing timing signal is generated after the preset delay time in response to determining that the touch sensing array is not being driven to perform the touch sensing.

8. The method of claim 1, wherein the fingerprint sensing timing signal to drive the fingerprint sensing array is generated in synchronization with the reference timing signal, and
wherein the generating the fingerprint sensing timing signal comprises:
counting a time in response to a pulse of the reference timing signal;
checking an operation state of the touch sensing array, after a preset delay time; and
in response to determining that the touch sensing array is not being driven to perform the touch sensing, generating the fingerprint sensing timing signal.

9. The method of claim 8, wherein the checking the operation state of the touch sensing array comprises:
detecting a voltage level of a signal line connected to a touch controller configured to drive the touch sensing array to perform the touch sensing; and
determining whether the touch sensing array is being driven according to the detected voltage level.

10. The method of claim 8, wherein the checking the operation state of the touch sensing array comprises:
requesting a touch controller driving the touch sensing array to perform the touch sensing for operation state information of the touch sensing array;
receiving the operation state information from the touch controller;
determining whether the touch sensing array is being driven according to the operation state information;
setting a flag bit in an internal register of the fingerprint controller to a first value before the driving the fingerprint sensing array; and
setting the flag bit to a second value after the driving the fingerprint sensing array.

11. A fingerprint controller for driving a fingerprint sensing array included in a touchscreen divided by at least a touch sensing region and a fingerprint sensing region, the fingerprint controller comprising:
a control logic configured to generate a fingerprint sensing timing signal for driving the fingerprint sensing array in synchronization with a reference timing signal provided from one of a touch controller and a display driver circuit;
an analog front end configured to drive the fingerprint sensing array in response to the fingerprint sensing timing signal, and convert analog sensing signals output from the fingerprint sensing array into digital values; and
a processor configured to generate a fingerprint image or touch data comprising touch coordinates on the fingerprint sensing region, based on the digital values,
wherein the touchscreen further comprises a touch sensing array, configured to be driven by the touch controller to perform touch sensing at the touch sensing region to generate touch data comprising touch coordinates on the touch sensing region, and a display panel configured to be driven by the display driver circuit to display an image on the touchscreen, and
wherein the control logic generates the fingerprint sensing timing signal at a time point different from a time point to start the driving the display panel to display the image and a time point to start the driving the touch sensing array to perform the touch sensing,
wherein the fingerprint controller, the touch controller and the display driver circuit are different from each other,
wherein a signal path of the fingerprint sensing timing signal is different from a signal path of the reference timing signal, and
wherein while the touch sensing array is driven to perform the touch sensing or the display panel is driven to display the image, the fingerprint sensing array is not driven to start fingerprint sensing.

12. The fingerprint controller of claim 11, further comprising:
a first interface circuit configured to receive a command from a host processor and transmit the fingerprint image to the host processor; and
a second interface circuit configured to transmit the touch data, comprising the touch coordinates on the fingerprint sensing region, to the touch controller configured to drive the touch sensing array.

13. The fingerprint controller of claim 11, wherein the reference timing signal indicates an end of the touch sensing in a cycle of a vertical synchronization signal of the display panel, and
wherein the control logic is further configured to generate the fingerprint sensing timing signal in response to a pulse of the reference timing signal.

14. The fingerprint controller of claim 11, wherein the reference timing signal is one of a touch sensing timing signal and a display timing signal, and
wherein the touch sensing timing signal is generated in a touch controller configured to drive the touch sensing array to perform the touch sensing, and the display timing signal is generated in a display driver circuit configured to drive the display panel to display the image.

15. The fingerprint controller of claim 14, wherein the control logic is further configured to generate the fingerprint sensing timing signal, after a predetermined delay time from a time when a pulse of the reference timing signal is generated.

16. A driver integrated circuit for driving a touchscreen divided into at least a touch sensing region and a fingerprint sensing region and comprising a display panel, a touch sensing array, and a fingerprint sensing array, the driver integrated circuit comprising:
- a touch controller configured to drive the touch sensing array to perform touch sensing at the touch sensing region in synchronization with a first timing signal received from an external module, and output touch data as a result of the touch sensing; and
- a fingerprint controller configured to receive the first timing signal from the touch controller, generate a second timing signal in synchronization with the first timing signal and drive the fingerprint sensing array to perform fingerprint sensing at the fingerprint sensing region in synchronization with the second timing signal and output a fingerprint image as a result of the fingerprint sensing, wherein the fingerprint controller and the touch controller are different from each other,
wherein a signal path of the first timing signal is different from a signal path of the second timing signal, and
wherein while the touch sensing array is driven to perform the touch sensing, the fingerprint sensing array is not driven to start fingerprint sensing.

17. The driver integrated circuit of claim 16, wherein the first timing signal is a display timing signal generated by a display driver circuit for driving the display panel to display an image on the touchscreen,
wherein the touch controller is configured to, in response to receiving the first timing signal from the external module, output the first timing signal used by the fingerprint controller to generate the second timing signal to drive the fingerprint sensing array, and in response to determining that the display driver circuit is not generating the first timing signal, generate and output a touch sensing timing signal as the first timing signal.

18. The driver integrated circuit of claim 17, wherein the touch controller is configured to, in response to determining that the driving the touch sensing array ends, generate a touch sensing end signal and output the touch sensing end signal as the second timing signal.

19. The driver integrated circuit of claim 17, wherein one cycle of the touch sensing timing signal, which is generated and output in response to the determining that the display driver circuit is not generating the first timing signal, is substantially same as one cycle of the first timing signal.

* * * * *